(12) United States Patent
Benoit et al.

(10) Patent No.: US 9,019,597 B2
(45) Date of Patent: Apr. 28, 2015

(54) DEVICE FOR SHORT-DISTANCE PROJECTION AT A REASONABLY LARGE ANGLE WITH ZOOM AND FOCUSING

(75) Inventors: Pascal Benoit, Rennes (FR); Guilhem Dubroca, Rennes (FR); Khaled Sarayeddine, Rennes (FR)

(73) Assignee: Optinvent, Rennes (FR)

( * ) Notice: Subject to any disclaimer, the term of this patent is extended or adjusted under 35 U.S.C. 154(b) by 194 days.

(21) Appl. No.: 13/574,658

(22) PCT Filed: Jan. 11, 2011

(86) PCT No.: PCT/EP2011/050279
§ 371 (c)(1),
(2), (4) Date: Aug. 13, 2012

(87) PCT Pub. No.: WO2011/089042
PCT Pub. Date: Jul. 28, 2011

(65) Prior Publication Data
US 2012/0327508 A1    Dec. 27, 2012

(30) Foreign Application Priority Data

Jan. 22, 2010 (FR) ..................... 10 50425

(51) Int. Cl.
G02B 15/14 (2006.01)
G02B 17/08 (2006.01)
G03B 21/14 (2006.01)
G03B 21/28 (2006.01)

(52) U.S. Cl.
CPC ............... G02B 17/08 (2013.01); G02B 15/14 (2013.01); G03B 21/14 (2013.01); G03B 21/28 (2013.01)

(58) Field of Classification Search
USPC ......... 359/364, 432, 648–650, 676, 677, 728, 359/733
See application file for complete search history.

(56) References Cited

U.S. PATENT DOCUMENTS

| | | | |
|---|---|---|---|
| 4,278,330 A | 7/1981 | Buchroeder | |
| 6,829,099 B2 * | 12/2004 | Kato et al. | 359/650 |
| 7,639,419 B2 * | 12/2009 | Chuang et al. | 359/364 |
| 8,169,717 B2 * | 5/2012 | Caldwell | 359/749 |
| 2004/0190154 A1 | 9/2004 | Wakai et al. | |
| 2010/0053737 A1 * | 3/2010 | Fujita et al. | 359/364 |
| 2010/0157421 A1 * | 6/2010 | Abe et al. | 359/364 |

FOREIGN PATENT DOCUMENTS

JP    2008-90200    4/2008
JP    2008-242025   10/2008

OTHER PUBLICATIONS

International Search Report for PCT/EP2011/050279 mailed Apr. 5, 2011.
Written Opinion of the International Searching Authority mailed Apr. 5, 2011.
English translation of International Preliminary Examination Report for PCT/EP2011/050279, Sep. 5, 2012.

* cited by examiner

*Primary Examiner* — Frank Font
(74) *Attorney, Agent, or Firm* — Nixon & Vanderhye, PC

(57) ABSTRACT

The invention proposes a short-distance front projection system, that is to say with a wide angle, occupying a small volume and offering a possibility of focusing as well a zoom function. It makes it possible to obtain images with a diagonal greater than 2 meters, the whole of the optical system being at least 50 cm from the plane of the image. This projector is constructed on the basis of three optical elements: an ocular, an afocal lens system and a final group forming an objective intended to form the intermediate image in front of the mirror.

9 Claims, 30 Drawing Sheets

| # | Type | Object | Radius of curvature | Thickness | Material | Half-Diameter |
|---|---|---|---|---|---|---|
| 1 | Plane | Object | | 0.482600 | | 13.522 |
| 2 | Plane | Pane | | 2.997200 | 1.487 ; 70.2 | 13.510 |
| 3 | Plane | | | 33.000000 | | 13.456 |
| 4 | Even asphere | L1 | Fig. 2 | 3.489682 | 1.525 ; 56.0 | 12.500 |
| 5 | Sphere | L1 | 175.532 | 2.329994 | | 12.500 |
| 6 | Sphere | L2 | -44.679 | 1.230502 | 1.700 ; 48.1 | 12.500 |
| 7 | Sphere | L2 | -320.226 | 0.100000 | | 12.500 |
| 8 | Sphere | L3 | 45.546 | 3.474587 | 1.847 ; 23.8 | 12.250 |
| 9 | Sphere | L3 | -101.163 | 0.100000 | | 12.100 |
| 10 | Sphere | L4 | 49.720 | 4.050529 | 1.497 ; 81.5 | 11.250 |
| 11 | Sphere | L5 | -29.678 | 0.908882 | 1.850 ; 32.3 | 11.000 |
| 12 | Sphere | L6 | 21.369 | 4.511692 | 1.487 ; 70.2 | 10.100 |
| 13 | Even asphere | L6 | Fig. 2 | 0.100000 | | 10.000 |
| 14 | Plane | Diaphragm | Infinite | Fig. 3 | | 9.725 |
| 15 | Sphere | L7 | 34.438 | 7.132341 | 1.497 ; 81.5 | 16.750 |
| 16 | Sphere | L7 | -122.531 | Fig. 3 | | 16.800 |
| 17 | Sphere | L8 | 85.612 | 1.808022 | 1.847 ; 23.8 | 16.700 |
| 18 | Sphere | L8 | 49.485 | Fig. 3 | | 16.400 |
| 19 | Sphere | L9 | 44.549 | 7.816404 | 1.667 ; 48.3 | 17.000 |
| 20 | Sphere | L9 | -150.961 | Fig. 3 | | 16.600 |
| 21 | Sphere | L10 | -39.359 | 9.204965 | 1.640 ; 60.1 | 16.000 |
| 22 | Sphere | L10 | 36.396 | Fig. 3 | | 16.650 |
| 23 | Sphere | L11 | 53.226 | 6.312249 | 1.805 ; 25.4 | 21.500 |
| 24 | Sphere | L11 | 314.227 | 0.100000 | | 21.600 |
| 25 | Sphere | L12 | 69.068 | 8.740793 | 1.717 ; 47.9 | 22.000 |
| 26 | Sphere | L12 | 57.427 | 9.534935 | | 21.450 |
| 27 | Sphere | L13 | -46.381 | 2.500000 | 1.697 ; 55.5 | 21.450 |
| 28 | Sphere | L13 | 122.731 | Fig. 3 | | 24.800 |
| 29 | Sphere | L14 | -33.638 | 9.554218 | 1.678 ; 55.3 | 25.100 |
| 30 | Sphere | L14 | -27.223 | Fig. 3 | | 26.200 |
| 31 | Sphere | L15 | -37.600 | 2.500000 | 1.525 ; 56.0 | 31.200 |
| 32 | Even asphere | L15 | Fig. 2 | Fig. 3 | | 34.900 |
| 33 | Even asphere | Mirror | Fig. 2 | Fig. 3 | Mirror | 98.668 |
| 34 | Plane | Image | | | | - |

Fig. 2

| # | Configuration 1 | Configuration 2 | Configuration 3 | Configuration 4 |
|---|---|---|---|---|
| 14 | 8.502 | 15.126 | 8.502 | 15.126 |
| 16 | 9.327 | 0.100 | 9.327 | 0.100 |
| 18 | 0.100 | 5.510 | 0.100 | 5.510 |
| 20 | 2.673 | 4.927 | 2.673 | 4.927 |
| 22 | 7.240 | 2.179 | 8.411 | 3.350 |
| 28 | 14.553 | 14.553 | 13.793 | 13.793 |
| 30 | 1.266 | 1.266 | 2.213 | 2.213 |
| 32 | 126.782 | 126.782 | 125.424 | 125.424 |
| 33 | -400.000 | -400.000 | -508.000 | -508.000 |

Fig. 3

| # | Radius of curvature | Conic | $a_4$ | $a_6$ | $a_8$ | $a_{10}$ | $a_{12}$ | $a_{14}$ | $a_{16}$ |
|---|---|---|---|---|---|---|---|---|---|
| 4 | 32.457791 | -- | 1.122276E-05 | 9.623450E-08 | -1.084837E-09 | 7.421701E-12 | -2.046841E-14 | 1.843687E-17 | -- |
| 13 | -39.631220 | -- | 1.686669E-05 | 1.106095E-07 | -3.402082E-09 | 3.997956E-11 | 1.899123E-13 | -6.554660E-15 | 3.329733E-17 |
| 32 | -39.920715 | -- | -3.060328E-08 | -1.206886E-09 | 7.232654E-12 | -3.451868E-15 | -- | -- | -- |
| 33 | -37.823805 | -2.743135 | -7.394768E-07 | 1.054767E-10 | -1.230864E-14 | 7.690303E-19 | -2.344519E-23 | -- | -- |
Fig. 4
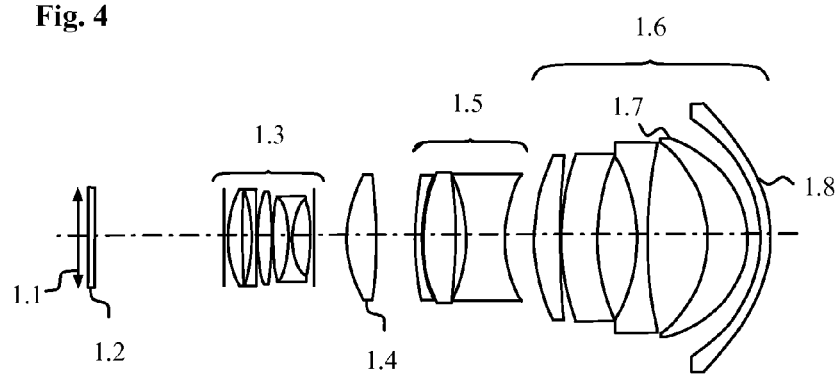
Fig. 5a
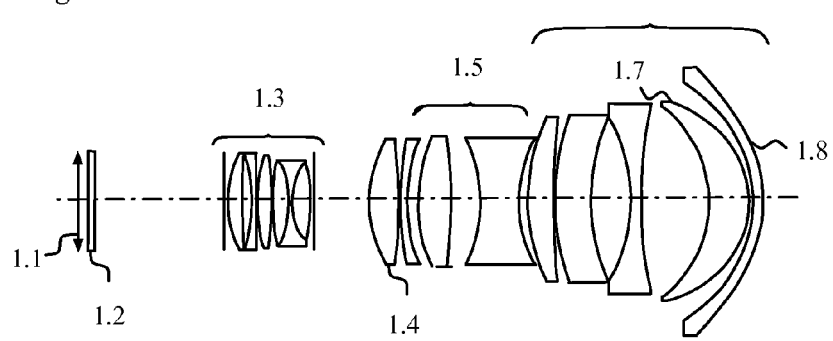
Fig. 5b
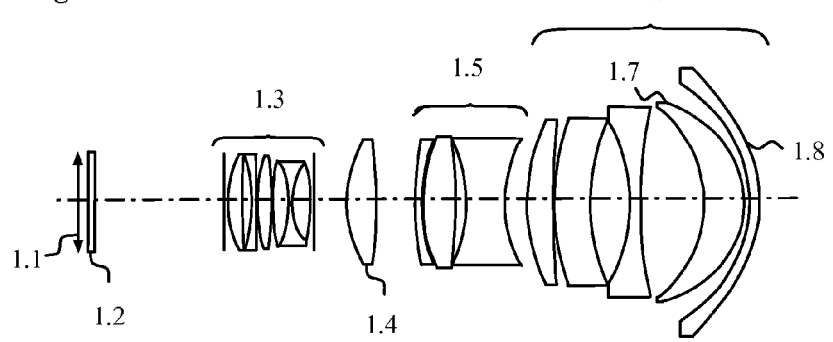
Fig. 5c

| # | Type | Object | Radius of curvature | Thickness | Material | Half-Diameter |
|---|---|---|---|---|---|---|
| 1 | Plane | Object | | 0.482600 | | 13.978 |
| 2 | Plane | Pane | | 2.997200 | 1.487 ; 70.2 | 13.960 |
| 3 | Plane | | | 33.000000 | | 13.884 |
| 4 | Even asphere | L1 | Fig. 15 | 13.174833 | 1.583 ; 59.4 | 12.500 |
| 5 | Sphere | L1 | 261.653455 | 0.099921 | | 10.290 |
| 6 | Sphere | L2 | 31.751416 | 7.436044 | 1.497 ; 81.5 | 9.835 |
| 7 | Sphere | L3 | -18.322027 | 5.147241 | 1.850 ; 32.3 | 9.024 |
| 8 | Sphere | L3 | -40.758766 | 1.695994 | | 10.059 |
| 9 | Even asphere | L4 | Fig. 15 | 0.999934 | 1.516 ; 64.1 | 10.060 |
| 10 | Even asphere | L4 | Fig. 15 | Fig. 14 | | 11.122 |
| 11 | Sphere | L5 | 34.982434 | 7.605053 | 1.497 ; 81.5 | 14.004 |
| 12 | Sphere | L5 | -52.174695 | Fig. 14 | | 14.187 |
| 13 | Sphere | L6 | 34.907470 | 6.310915 | 1.516 ; 64.1 | 14.510 |
| 14 | Sphere | L6 | -78.668052 | 0.948459 | | 14.299 |
| 15 | Sphere | L7 | -45.243004 | 5.241090 | 1.806 ; 40.9 | 14.318 |
| 16 | Sphere | L8 | 37.662717 | 5.107241 | 1.847 ; 23.8 | 14.362 |
| 17 | Sphere | L8 | -245.501738 | Fig. 14 | | 14.363 |
| 18 | Sphere | L9 | 68.621840 | 0.926970 | 1.847 ; 23.8 | 14.138 |
| 19 | Sphere | L9 | 23.254628 | Fig. 14 | | 13.670 |
| 20 | Sphere | L10 | 48.611801 | 4.780283 | 1.847 ; 23.8 | 20.275 |
| 21 | Sphere | L10 | 127.676521 | 0.100000 | | 20.266 |
| 22 | Sphere | L11 | 38.129674 | 6.799559 | 1.571 ; 50.8 | 21.103 |
| 23 | Sphere | L11 | 55.982570 | 8.150612 | | 20.521 |
| 24 | Sphere | L12 | -51.612578 | 1.500000 | 1.713 ; 53.9 | 20.521 |
| 25 | Sphere | L12 | 60.192708 | 16.545073 | | 22.387 |
| 26 | Even asphere | L13 | Fig. 15 | 10.571212 | 1.531 ; 56.0 | 22.385 |
| 27 | Even asphere | L13 | Fig. 15 | Fig. 14 | | 27.358 |
| 28 | Even asphere | Mirror | Fig. 15 | Fig. 14 | Mirror | 100.404 |
| 29 | Plane | Image | | | | - |

| # | Configuration 1 | Configuration 2 | Configuration 3 | Configuration 4 |
|---|---|---|---|---|
| 10 | 1.920 | 6.476 | 1.920 | 6.476 |
| 12 | 0.330 | 0.966 | 0.330 | 0.966 |
| 17 | 3.131 | 1.108 | 3.131 | 1.108 |
| 19 | 12.296 | 9.127 | 13.665 | 10.496 |
| 27 | 131.488 | 131.488 | 130.119 | 130.119 |
| 28 | -425.000 | -425.000 | -540.000 | -540.000 |

Fig. 15

| # | Radius of curvature | Conic | $a_4$ | $a_6$ | $a_8$ | $a_{10}$ | $a_{12}$ | $a_{14}$ |
|---|---|---|---|---|---|---|---|---|
| 4 | 32.580569 | | 2.677138E-05 | 1.405139E-08 | 1.527059E-10 | -3.391575E-12 | 2.981641E-14 | -7.911867E-17 |
| 9 | -18.113017 | | 7.217311E-06 | 1.243278E-07 | -1.620564E-09 | 6.696523E-12 | | |
| 10 | -59.828316 | | 2.755443E-05 | 5.513894E-08 | -7.739110E-10 | 2.630775E-12 | | |
| 26 | -26.174540 | | -2.427472E-05 | 1.463182E-08 | 8.637952E-11 | -2.569033E-14 | | |
| 27 | -28.592770 | | -1.148811E-05 | 1.723931E-09 | 7.470746E-12 | 2.195606E-14 | | |
| 28 | -44.930059 | -2.343927 | -5.054639E-07 | 5.499446E-11 | -6.186563E-15 | 3.856112E-19 | -1.293843E-23 | |

DEVICE FOR SHORT-DISTANCE PROJECTION AT A REASONABLY LARGE ANGLE WITH ZOOM AND FOCUSING

This application is the U.S. national phase of International Application No. PCT/EP2011/050279 filed 11 Jan. 2011 which designated the U.S. and claims priority to FR 10/50425 filed 22 Jan. 2010, the entire contents of each of which are hereby incorporated by reference.

BACKGROUND OF THE INVENTION

1. Field of the Invention

The present invention concerns image projectors and, more particularly, optical devices for projecting images or videos, as far as the images or videos have to be displayed onto a surface.

2. Description of Prior Art

Short-distance projectors appeared first in the field of back projection. The reduction in volume necessary for the projection system makes it possible to appreciably reduce the size of the furniture containing the entire system. Examples of systems of this type are described in the patent applications WO 2006/043666 and WO 2006/058884.

The particularity of these systems relates to the fact that the projector is fixed with respect to an image plane of given size. These systems project images of known fixed size at a distance also fixed from the last optical element having a focal power, in this case a curved mirror, that is generally concave. These documents also show that such systems can be constructed from elements all having the same symmetry axis of revolution and a single curved mirror. These mirrors are relatively expensive and the fact of using only one of them is therefore advantageous. In addition, these mirrors are not integrated in the barrel containing the lenses forming the device, which causes assembly difficulties. This assembly is greatly facilitated by the presence of a symmetry axis.

Because of the projection distance and the size of the fixed image, these systems do not require focusing or a zoom function.

These projectors can be used for designing front projection systems. In a front projection system, the projection is not mechanically connected to the projection surface. It is then advantageous to allow focusing by adjustment of the relative positions of certain lenses in order to adjust the sharpness of the image for a given distance between the projector and the projection surface. Such a front projection is known from the patent application WO 2008/11159.

The size of the projection surface may vary during the use of such a front projection system. It is then advantageous to have available a projector with a zoom function for adapting to different sizes of projection surface.

SUMMARY OF THE INVENTION

The invention aims to solve the above problems by a short-distance front projection system, that is to say with a large angle, occupying a small volume, and which offers a possibility of focusing as well as a zoom function. It makes it possible to obtain images with a diagonal greater than 2 meters, the whole of the optical system being less than 50 cm from the plane of the image. This projector is constructed on the basis of three optical elements: an ocular, an afocal lens system and a final group forming an objective intended to form the intermediate image in front of the mirror.

The invention concerns a short-distance projection device comprising, in the order of propagation of the light beam: an imager forming the image; an ocular formed by a set of lenses forming an approximately parallel beam; an objective formed by a set of lenses forming an intermediate image with a field curvature; an aspherical concave mirror generating the final image, the field curvature given by the objective compensating for the deformation introduced by the aspherical concave mirror and an afocal lens system consisting of a set of lenses between the ocular and the objective, these lenses being able to move in translation on their optical axis in order to vary the magnification generated by the afocal lens system, and this providing said device with zoom capabilities.

According to a particular embodiment of the invention, the lenses forming the objective are made movable in translation on their optical axis in order to make it possible to vary the distance at which the final image is generated, and in doing so providing the device with focusing capabilities.

According to a particular embodiment of the invention, the lenses forming the ocular, the afocal lens system and the objective, as well as the aspherical mirror, share the same optical axis.

According to a particular embodiment of the invention, the afocal lens system is composed of a first convergent lens followed by a divergent lens, a new convergent lens and a last diversion lens.

According to a particular embodiment of the invention, in order to obtain a reduction of the final image, the afocal lens system is formed so that: the first convergent lens is made movable in translation on the optical axis to make it possible to move it away from the ocular, the first divergent lens is made movable in translation on the optical axis to make it possible to move it closer to the first convergent lens, and the last divergent lens is made movable in translation on the optical axis to make it possible to move it away from the second convergent lens.

According to a particular embodiment of the invention the objective comprises a first convergent lens, followed by one or more divergent lenses and then one or more lenses including at least one with its centres of curvature situated on the same side of the surface referred to as a meniscus.

According to a particular embodiment of the invention, the objective is formed so that: all the lenses are made movable in translation on the optical axis to make it possible to move them closer to the mirror, and the first convergent lens and the meniscus are made movable in translation on the optical axis to make it possible to move them closer together.

According to a particular embodiment of the invention, the afocal lens system comprises two convergent lenses or groups of convergent lenses and a last divergent lens.

According to a particular embodiment of the invention, the afocal lens system is formed so that two convergent lenses or groups of lenses and the last divergent lens are made movable in translation on the optical axis to allow independent movement in the optical propagation direction.

According to a particular embodiment of the invention, the objective comprises a first convergent lens followed by one or more divergent lenses and then an aspherical lens.

According to a particular embodiment of the invention, the objective is made movable in translation on the optical axis in a single block.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIGS. 2, 3 and 4 give the precise physical features of the first example embodiment.

FIG. 5 illustrates the first three given configurations of the first example embodiment.

FIGS. 13, 14 and 15 give the precise physical features of the second example embodiment.

DESCRIPTION OF THE PREFERRED EMBODIMENTS

Figure 1:
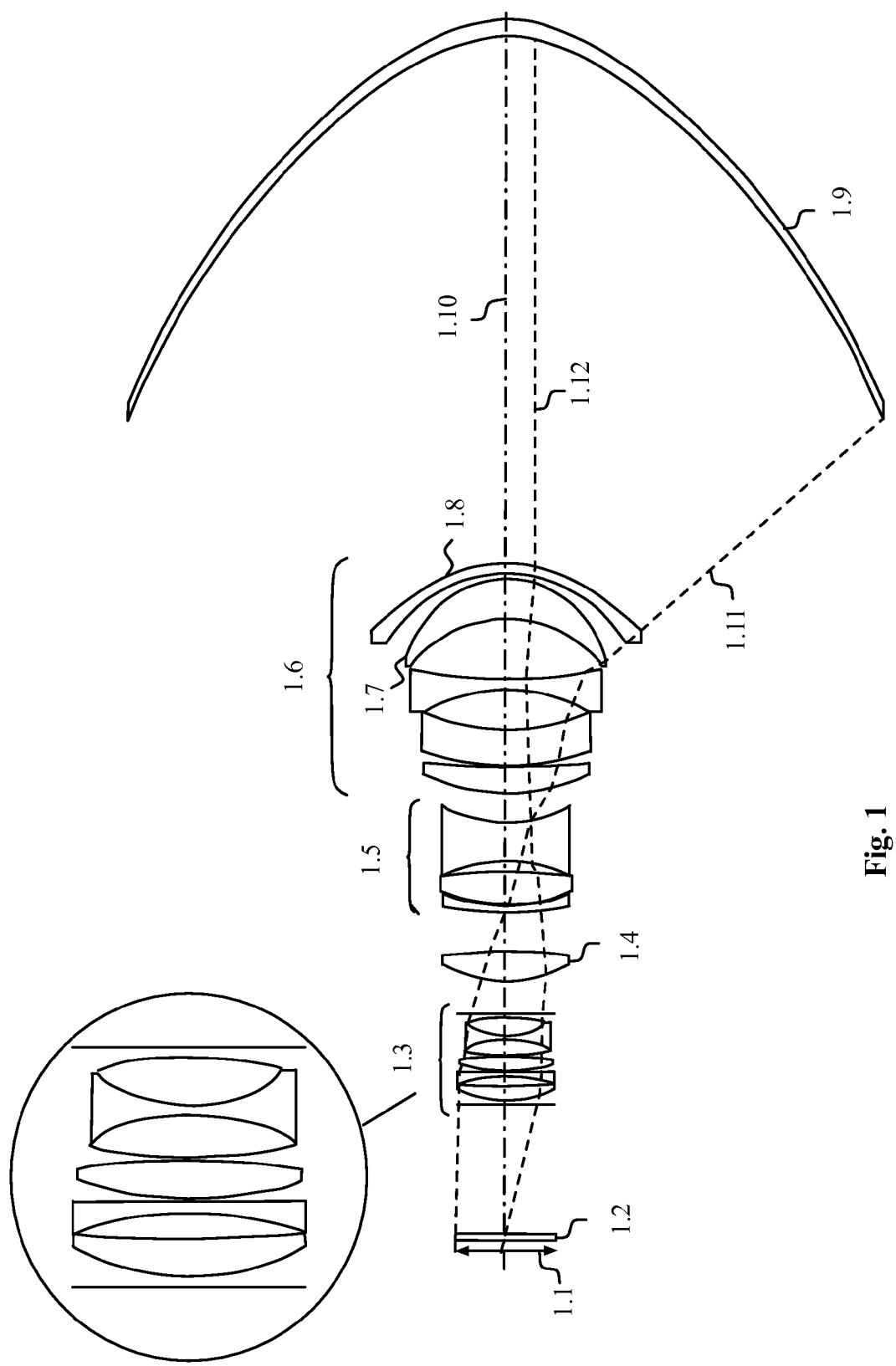
FIG. 1 illustrates the first embodiment.

A projection device is defined as an optical device which, when it is placed on the path of a light beam issuing from an imager, makes it possible to generate a final image external to the device. A short-distance projection device is described herein since the projection distance envisaged is around a few tens of centimeters. It is obvious that the inventive device described may be constructed to other scales enabling projections that are closer or on the contrary further away.

The particular problem encountered in a front projection application relates to the compactness of the system, the magnitude of the field curvature and the very great astigmatism, all compensated for on the final image by the curved mirror. It is this compensation that makes it possible to obtain large images at a short distance. It is in principle difficult to conceive of and even accept the possibility of designing such a system with focusing and a zoom function.

Focusing consists of obtaining a sharp image over a range of distances vis-à-vis the last optical element having a focal power, namely the concave mirror. When the distance to the concave mirror increases, the image increases in proportion to the natural expansion of the beam. The size of the image then follows an affine law that is a function of the distance to the mirror.

The zoom consists of obtaining images of different sizes at a fixed distance from the mirror.

These front projection systems comprise schematically the following elements. An image is formed by an imager. The beam issuing from this imager is then transformed, at least approximately, into a parallel beam by a series of lenses forming an ocular. This substantially parallel beam then passes through a set of lenses, which is referred to as an objective, which gives the field curvature and forms the intermediate image. The beam issuing from this objective is then projected onto a concave aspherical mirror which gives the strong magnification of the image and its short-distance projection. The high field curvature given by the objective compensates for the high curvature introduced by this concave aspherical mirror in order to obtain a final image that is deformed as little as possible.

The objective is formed by a set of lenses made movable in translation on their optical axis to vary the distance at which the final image is generated. In doing this, the device is provided with focusing capabilities.

The device comprises typically a lens with its centres of curvature situated on the same side of the surface, referred to as the meniscus, of positive focal power, situated close to the mirror. It is often the last lens of the objective, that is to say the lens closest to the mirror. It is typically preceded by one or more divergent lenses, themselves preceded by a convergent lens. When these lenses forming the objective are moved, the position of the intermediate image and therefore the position of the final image is also slightly moved. In this way the focusing function is obtained by moving the lenses forming the objective of the system. Advantageously, the focusing is done by moving all the lenses forming the objective of the mirror closer together, while within the objective the distance between the first lens—the furthest away from the mirror— and the meniscus decreases. According to some embodiments of the invention, the meniscus may be replaced by a set of lenses, at least one of which is in the form of a meniscus and fulfilling the same function. According to some embodiments, the focusing is obtained by the same movement in a block of all the lenses of the objective. According to a particular embodiment of the invention, the object comprises a last aspherical lens between the meniscus and the mirror. Alternatively, the function of the meniscus is integrated in an aspherical lens that then adopts a meniscus shape but the focal power of which close to the optical axis is slightly negative.

The objective is therefore moved closer to the mirror in order to effect a focusing at a greater distance. Moving the objective closer to the mirror therefore moves the final image away from it. The lens furthest away from the mirror and moving in a block with the objective is a convergent lens. The meniscus is optionally brought closer to this first convergent lens.

It is seen that the beam issuing from the ocular is substantially parallel. The size of the final image depends on the angles and height at which the rays issuing from the ocular enter the objective. According to the invention, a new group of lenses between the ocular and the objective are added between the ocular and the objective in order to form an afocal lens system. These lenses are movable in translation on their optical axis to make it possible to vary the enlargement generated by the afocal lens system. This afocal lens system will make it possible to vary the height and the angles of the rays issuing from the ocular and entering the objective, thus making it possible to vary the size of the final image and, in doing so, to implement the zoom function.

According to a first embodiment, the afocal lens system is composed of a first convergent lens followed by a divergent lens, a new convergent lens and a last divergent lens. A reduction in the final image is then obtained by moving the first convergent lens away from the exit diaphragm of the ocular, moving the first divergent lens closer to the first convergent lens and moving the last divergent lens away from the second convergent lens. The absolute movement of the second convergent lens is fairly small. This zoom function is characterised by a movement of the first convergent lens and the last divergent lens towards the objective. The amplitude of the movement is different for the two lenses and results in a narrowing of the final image. This design of the afocal lens system makes it possible to modify the final field curvature only slightly and the images therefore remain clearly defined. Advantageously, the first convergent lens has a large Abbe number, typically greater than 60, and the first divergent lens a small Abbe number, typically less than 30. The other two lenses may have more moderate dispersion characteristics with Abbe numbers close to 50.

In a second embodiment, the divergent lenses are now at the start and end of the afocal lens system. The movable parts are the first positive lens, a second group of lenses with a positive total focal power, convergent, and the last divergent lens. The direction of movement of the lenses is as follows. The last divergent lens moves closer to the following convergent lens constituting the start of the objective, which limits the useful diameter of the latter. In other words, the last divergent lens is made movable in translation on the optical axis in the direction of the optical propagation. Likewise, the two convergent groups move towards the right, that is to say in the direction of optical propagation, so as to more strongly divert the beams moving away from the optical axis. The movements of these movable parts are independent of one another. Advantageously, the convergent lens must have low scatter, typically an Abbe number greater than 50.

An example embodiment of the projector according to the first embodiment, is illustrated by FIG. 1. The purpose of the device described is to produce a large image, typically around 85 inches in diameter and 400 mm from the last optical element having a focal power, and therefore from the mirror 1.9. The device is composed of a dioptric system 1.1 to 1.8, followed by a concave mirror 1.9. All the elements having a focal power have the same axis of revolution 1.10. It is provided with means of providing a focusing range and a zoom so as to be able to be used in front projection.

The concave mirror has dimensions appreciably greater than the lenses of the objective 1.6. It is therefore difficult to move with precision. It is therefore advantageous that the length of the optical system should not vary during focusing or zooming. The distance from the object the image of which is being made to the concave mirror therefore remains constant whatever the configuration in question.

In order to produce the image that is enlarged by the optical system, a microdisplay 1.1 is used. It is possible to use an imager with micro-mirrors such as DLP (Digital Light Processing) manufactured by Texas Instruments, but other microdisplay technologies can be used such as liquid crystal microdisplays.

The imager 1.1 used measures 14.0288×10.5216 mm. Its resolution is 1024×768 pixels. It is at this resolution that the performances of the optical system are given hereinafter. It is off centre by 6.3 mm in the direction of its small side with respect to the optical axis, the common axis of revolution 1.10 of the lenses.

The device is composed of the imager 1.1, a window 1.2, an ocular 1.3, an enlargement of which is provided in the figure, making it possible to distinguish the six lenses clearly, an afocal lens system 1.4 and 1.5, an objective 1.6 comprising a meniscus 1.7 followed by an aspherical lens 1.8 and the aspherical concave mirror 1.9. The beam is illustrated by two extreme rays 1.11 and 1.12. The final image is formed by the reflection of the beam on the mirror above and to the left of the device.

The entrance pupil of the system, at the entrance to the ocular, is situated at 51.848 mm of air from the imager, in the direction of propagation of the light leaving the imager. Its diameter is 25.924 mm, and the amplitude of the device is therefore f/2. Its centre is situated on the optical axis.

The table in FIG. 2 gives the physical features of the device. When two lenses are linked, the interface described as common is attributed to the lens following in the direction of propagation of the rays. The lenses of the device are numbered from L1 to L15, still in this propagation direction. The material indicated is the material of the medium of which the interface is the entrance. When it is not specified, it is air. The materials are characterised by their index and Abbe number at a wavelength of 587.6 nm. They are typically glass except for the lens 15, made from plastics material.

The variable thicknesses are given for four particular focusing and zoom facilities in FIG. 3. Configuration 1 corresponds to a nominal configuration of the device. Configuration 2 describes the device in a maximum zoom position corresponding to a minimum final image size. Configuration 3 corresponds to a maximum focusing. Configuration 4 corresponds to a maximum zoom and focusing and is therefore a combination of configurations 2 and 3.

The definition of the aspherical surfaces is given in the table in FIG. 4. The aspherical surfaces obey the equation:

$$z(r) = \frac{r^2/R}{1 + \sqrt{1 - (1+k)(r/R)^2}} + \sum_i a_{2i} r^{2i}$$

the coefficients of which are given in FIG. 4, R being the radius of curvature and k the conic As for FIG. 5, this illustrates the first configurations of the table in FIG. 3. FIG. 5a corresponds to configuration 1, FIG. 5b corresponds to configuration 2 and FIG. 5c corresponds to configuration 3.

The device is parfocal, in the sense that the means of providing the zoom and focusing are independent. For focusing at 400 mm from the curved mirror, it is perceived that the distance between the diaphragm and the lens 11—the first lens of the objective—remains constant. When focusing at distances from the curved mirror greater than 400 mm, the distance between the lenses 11 and the lens 10—the last lens of the afocal lens system—increases, which ensures that the focusing and zoom do not interfere with each other.

It is also found that the aperture is constant whatever the configuration.

The device makes it possible to obtain a magnification of approximately 112 times for configuration 2, the one giving the smallest images at 400 mm. The magnification may range up to 160 times in configuration 3, which gives the largest images at 508 mm. Configuration 1 makes it possible to obtain a magnification of approximately 123.5 times, that is to say a nominal image of 85 inches. At a given projection distance, the zoom makes it possible to obtain images with a size varying from approximately 10% (counted from the smallest image).

The device described has large angles of incidence on the screen. In the top corners of the image, the angles of incidence on the screen are approximately 80° for the position of the zoom making it possible to obtain the largest image at a given distance from the mirror.

The focusing system makes it possible to vary the projection distance from 400 to 508 mm.

Figure 6:
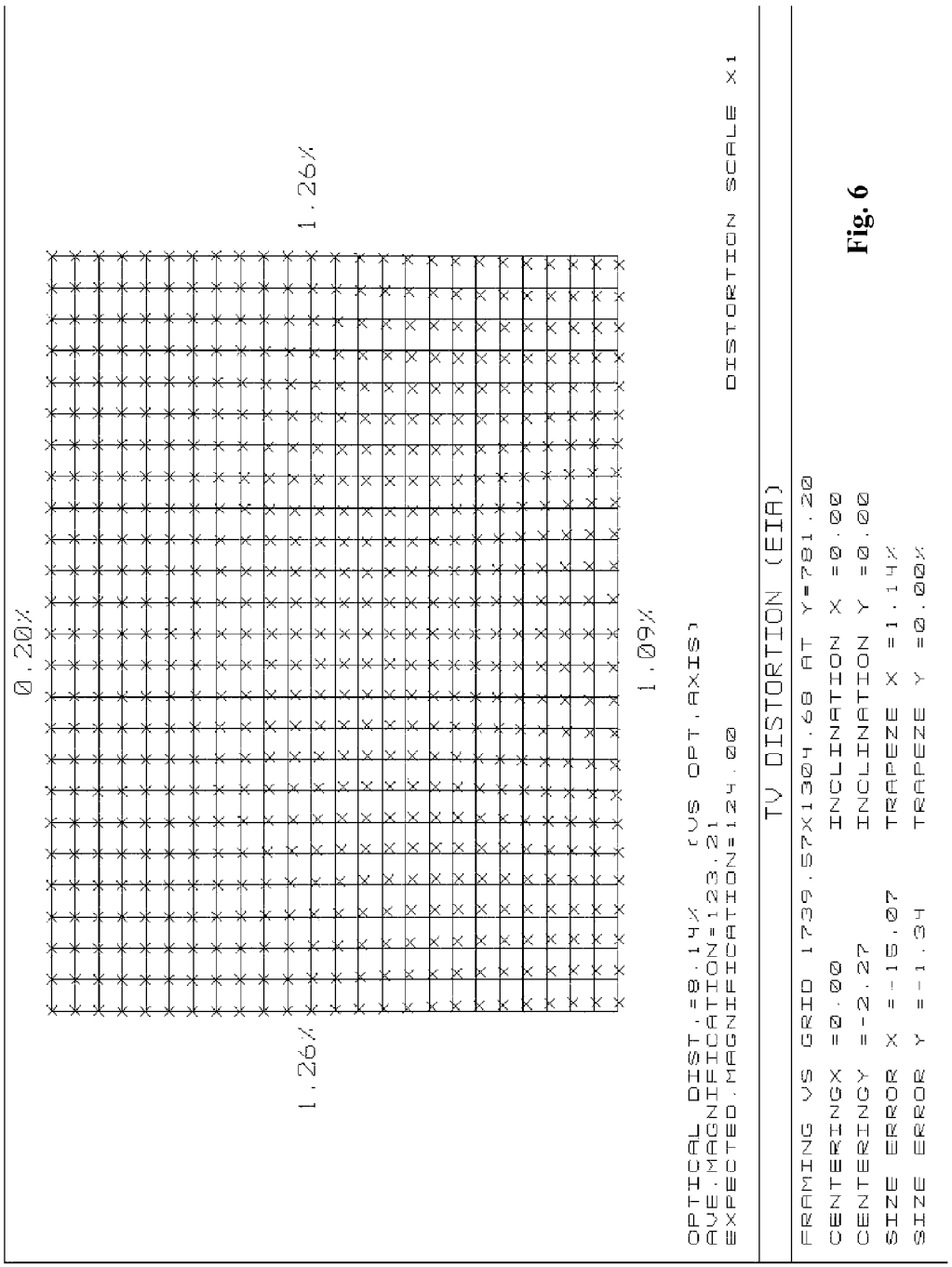
FIGS. 6, 7 and 8 give the distortion of the image in configurations 1, 2 and 3 of the first example embodiment.
Figure 7:
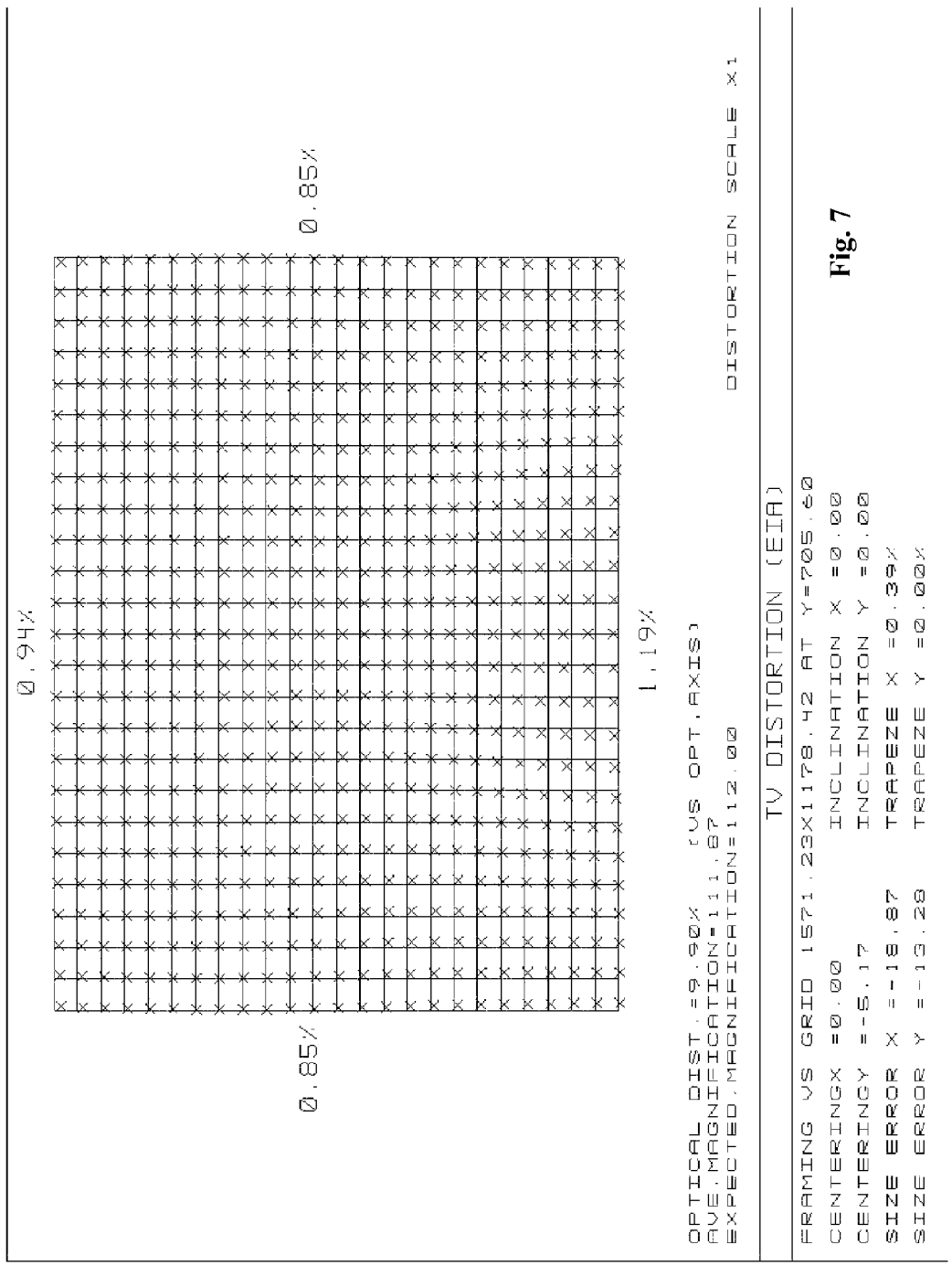
Figure 8:
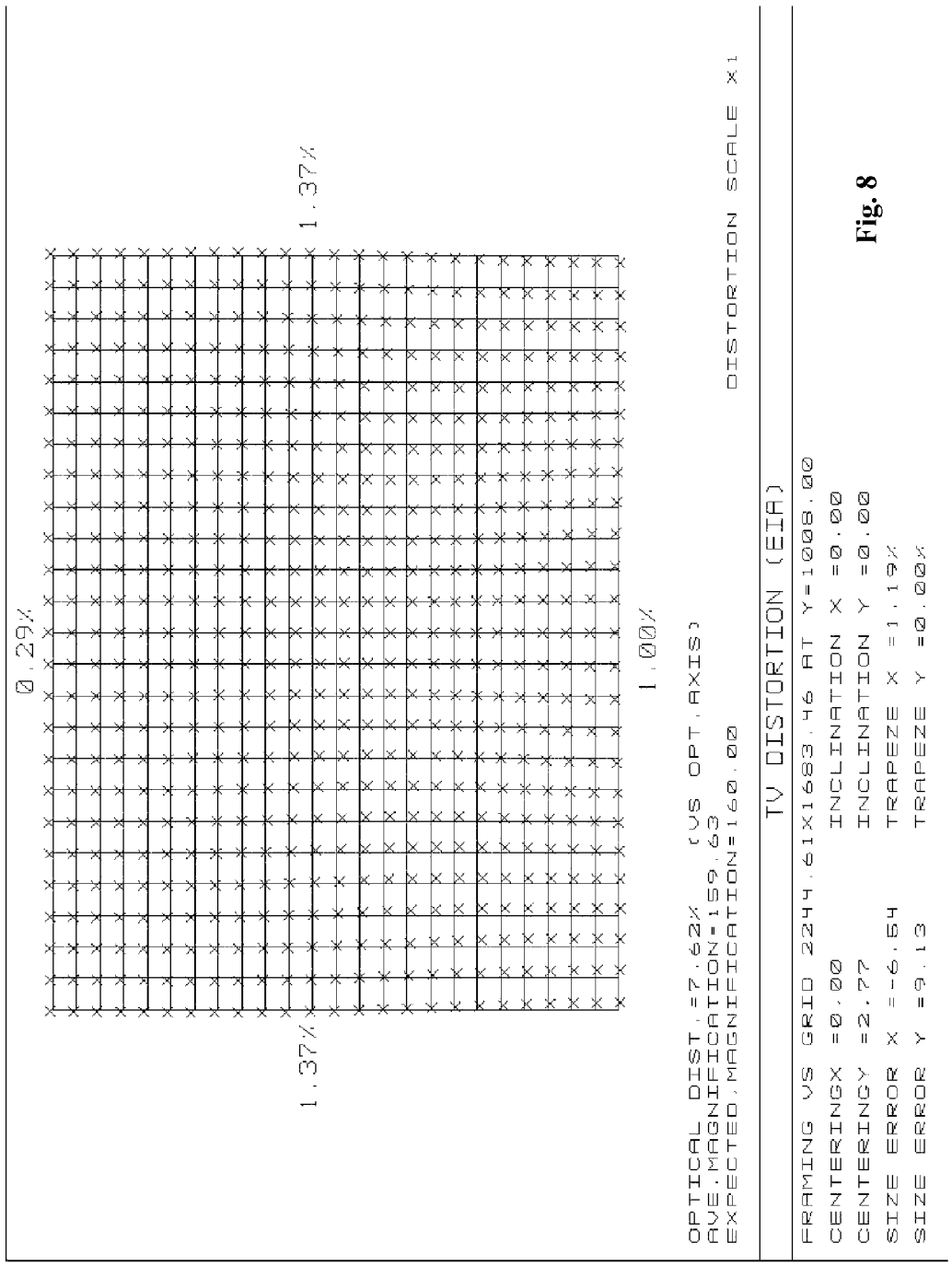

FIGS. 6, 7 and 8 give the distortion of the image in configurations 1, 2 and 3.

Figure 9A:
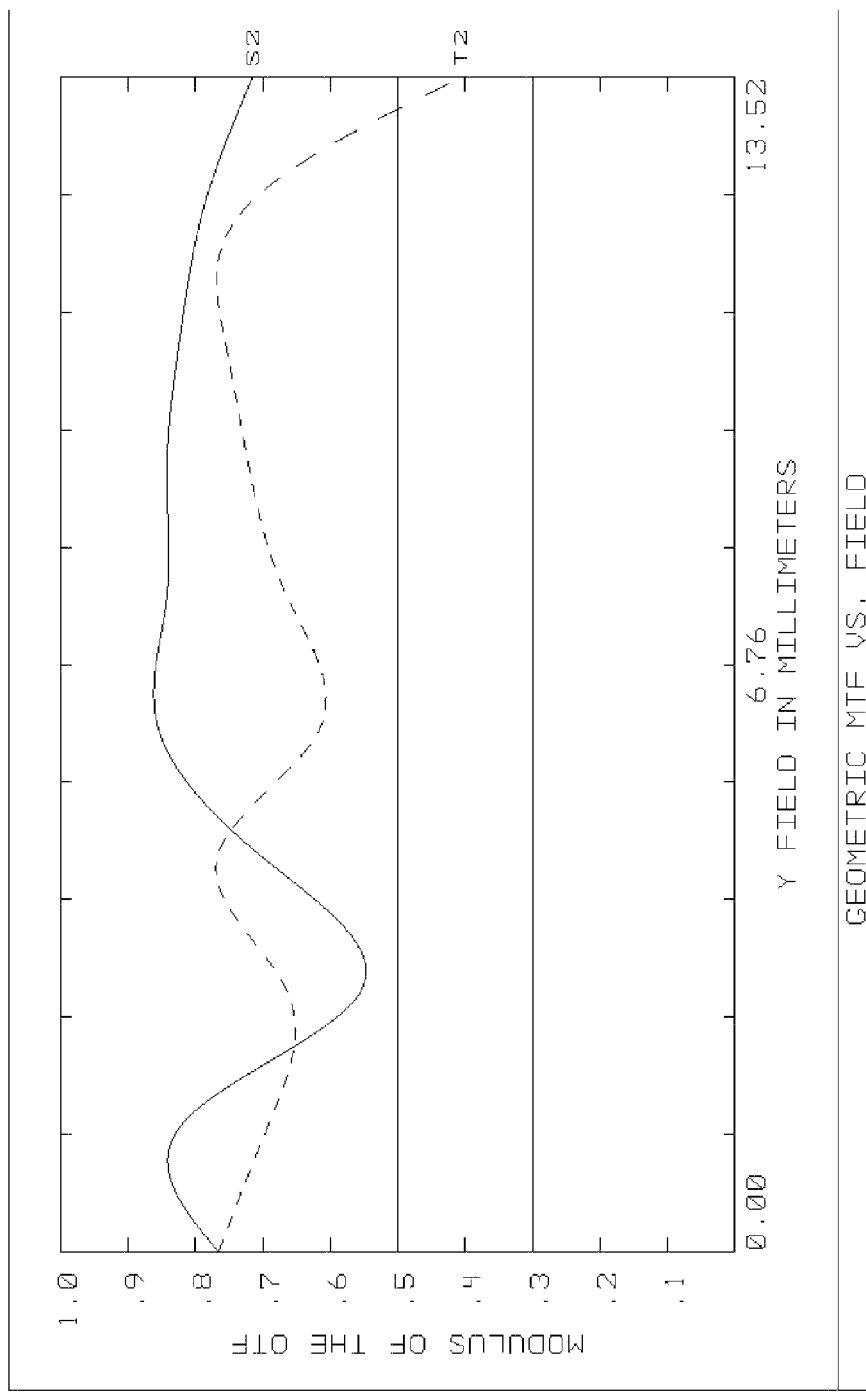
FIGS. 9, 10 and 11 give the modulation transfer functions of configurations 1, 2 and 3 of the first example embodiment.
Figure 9B:
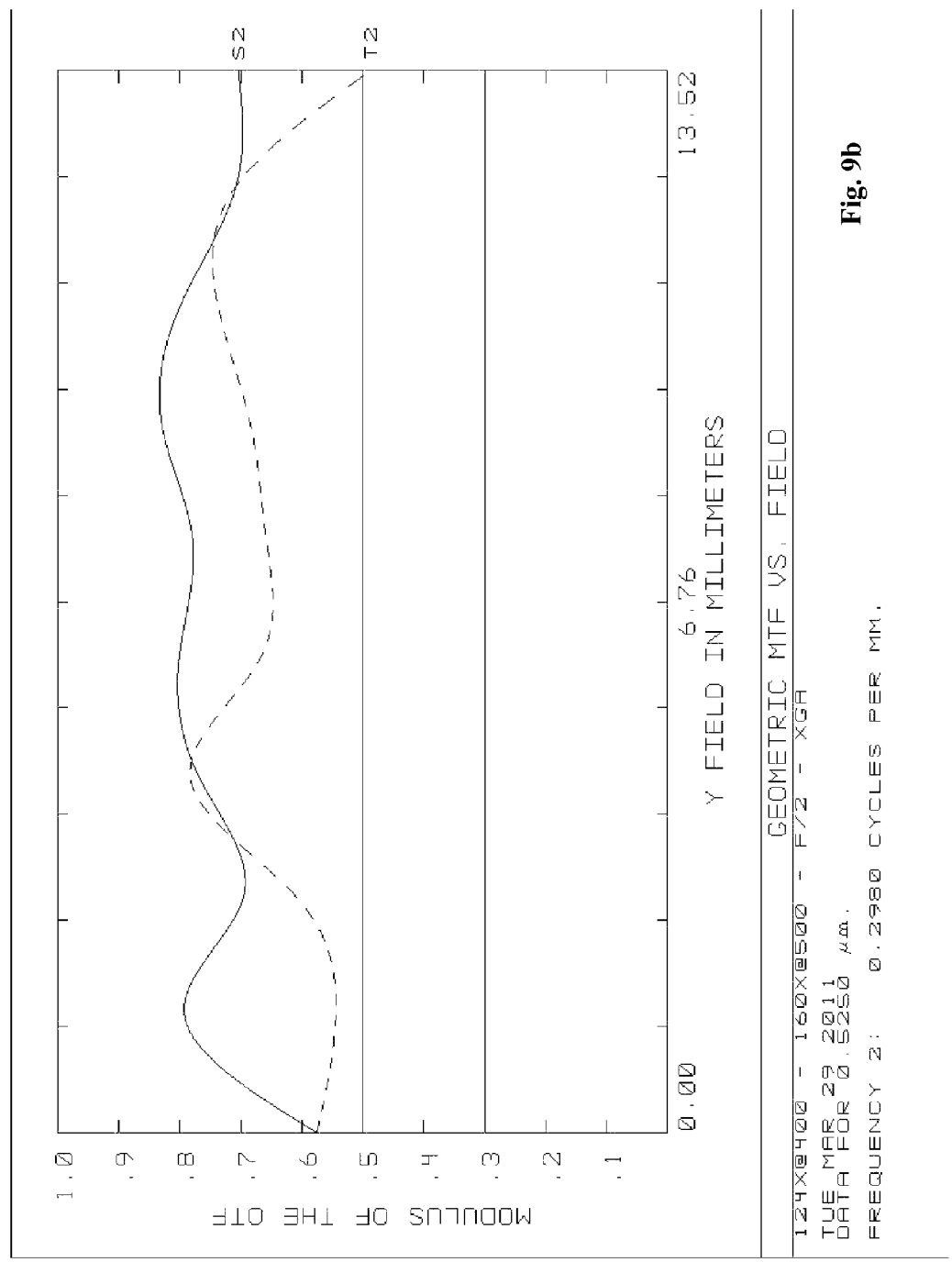
Figure 9C:
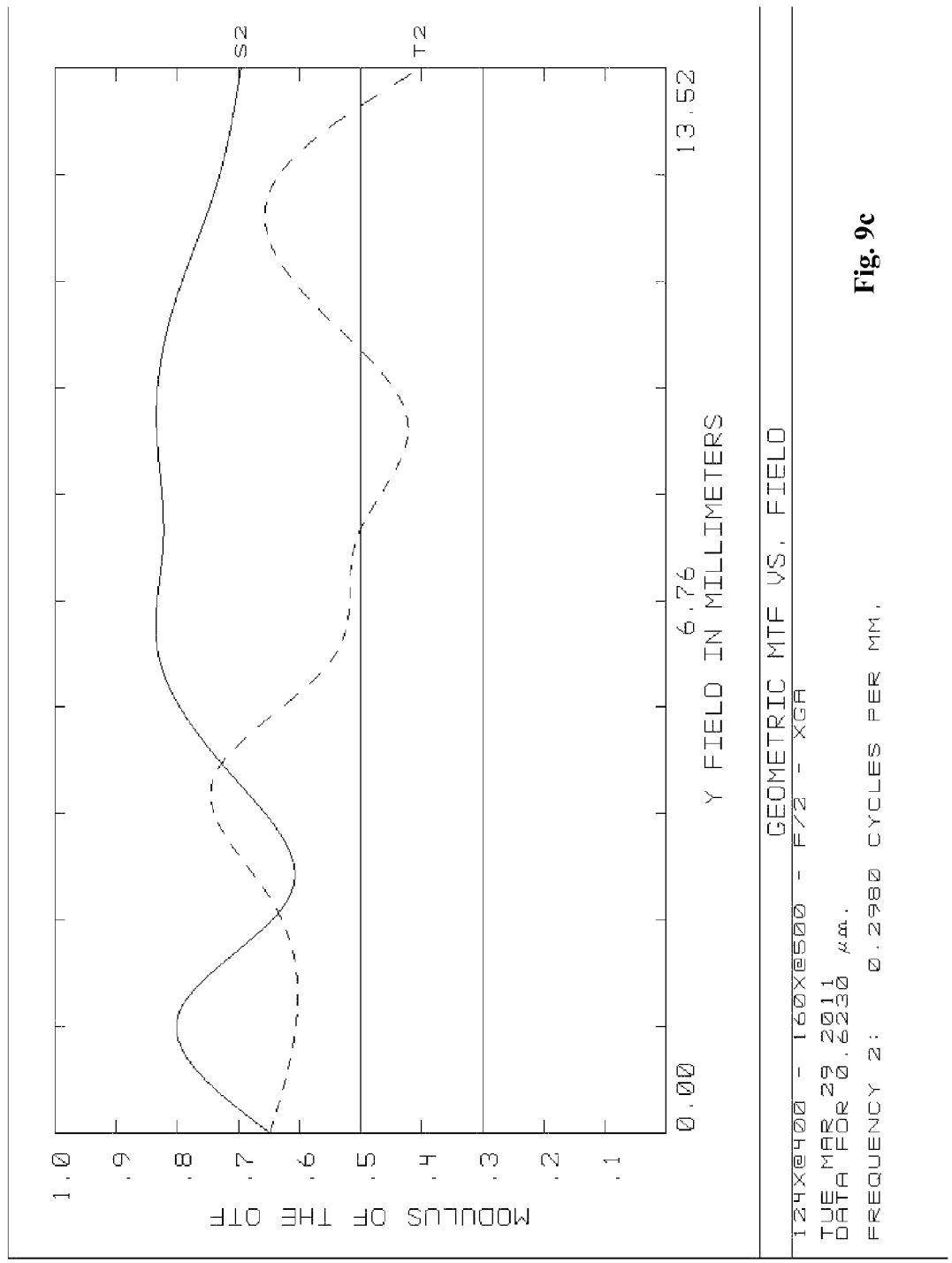
Figure 10A:
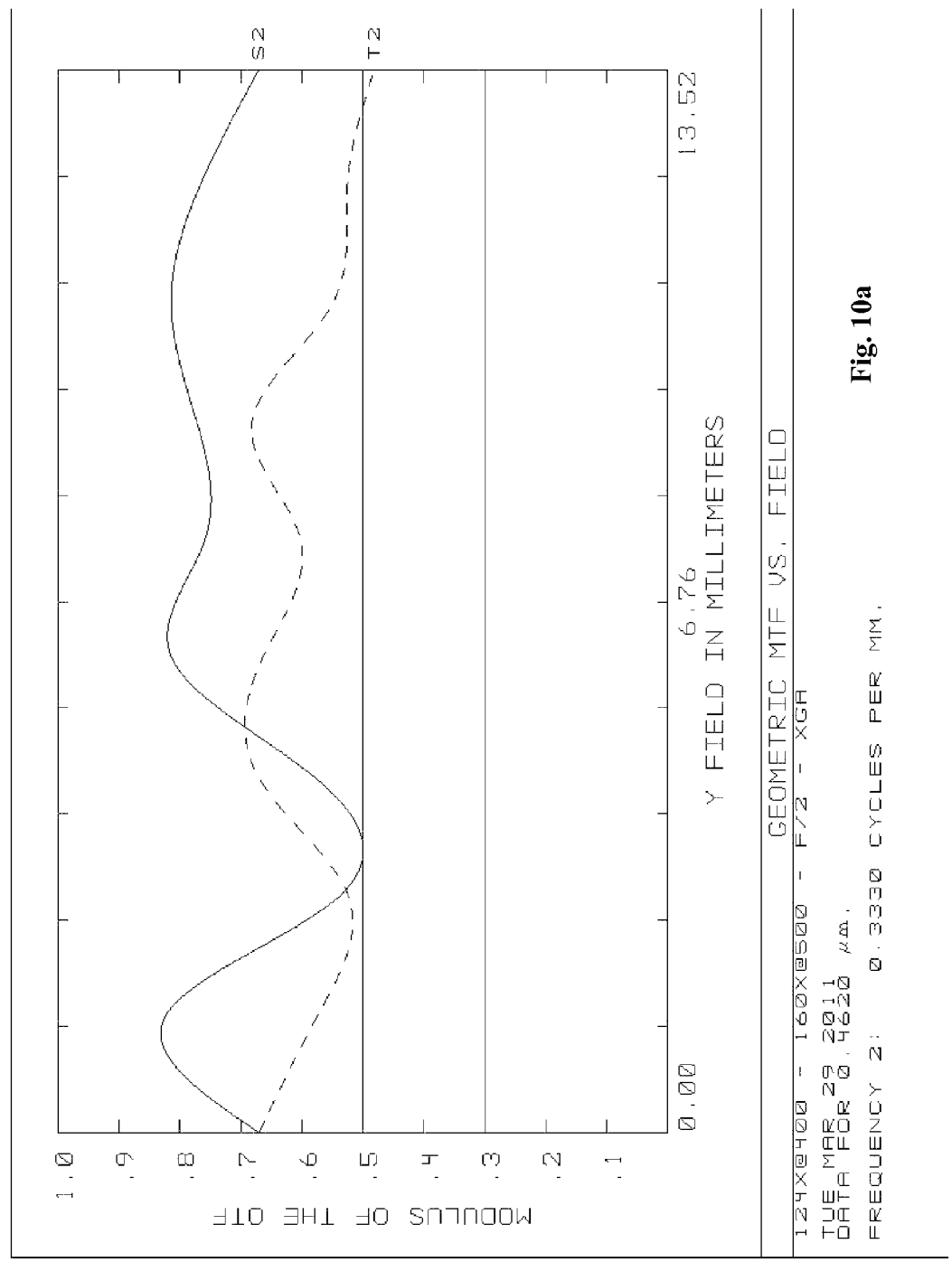
Figure 10B:
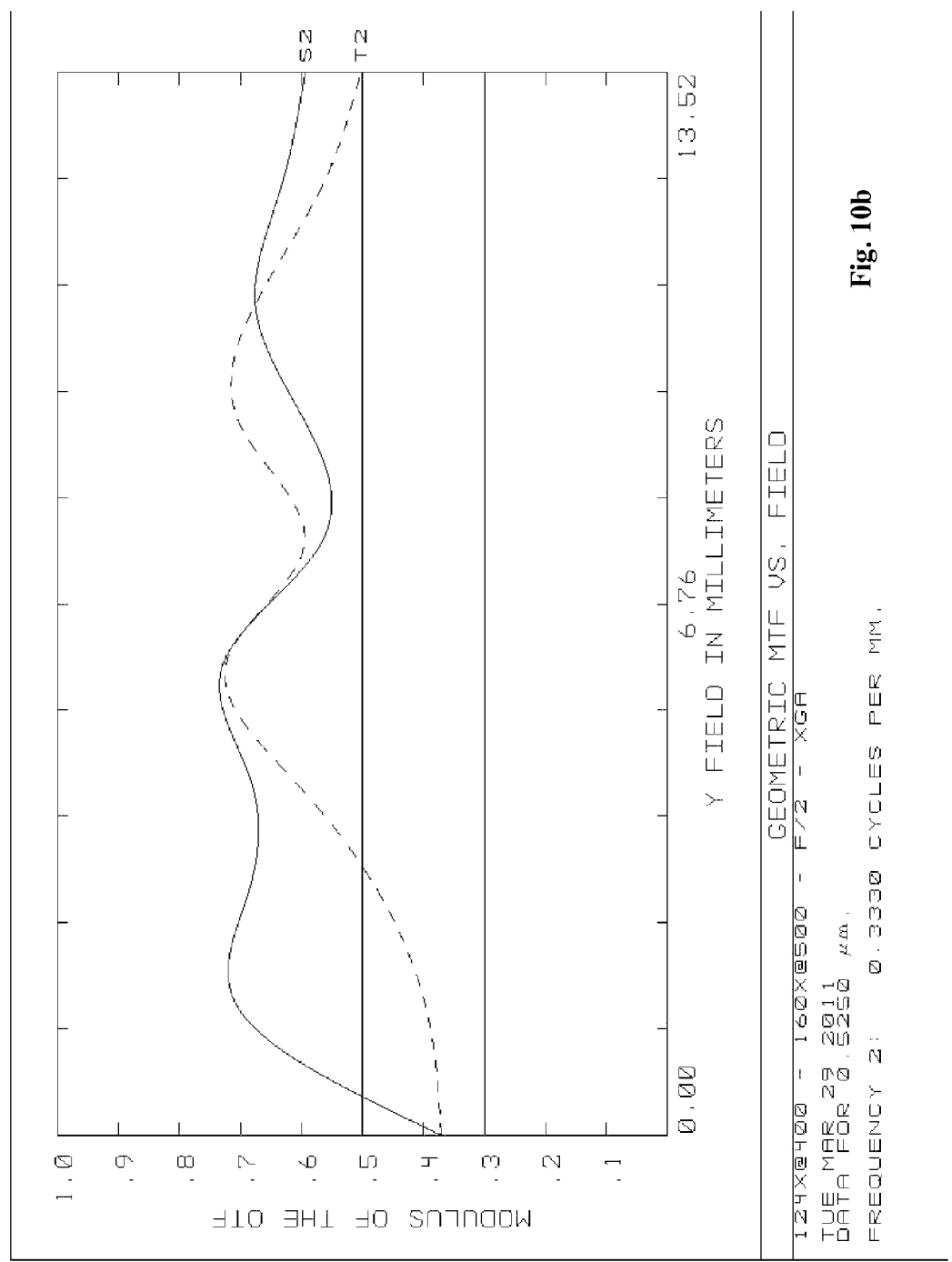
Figure 10C:
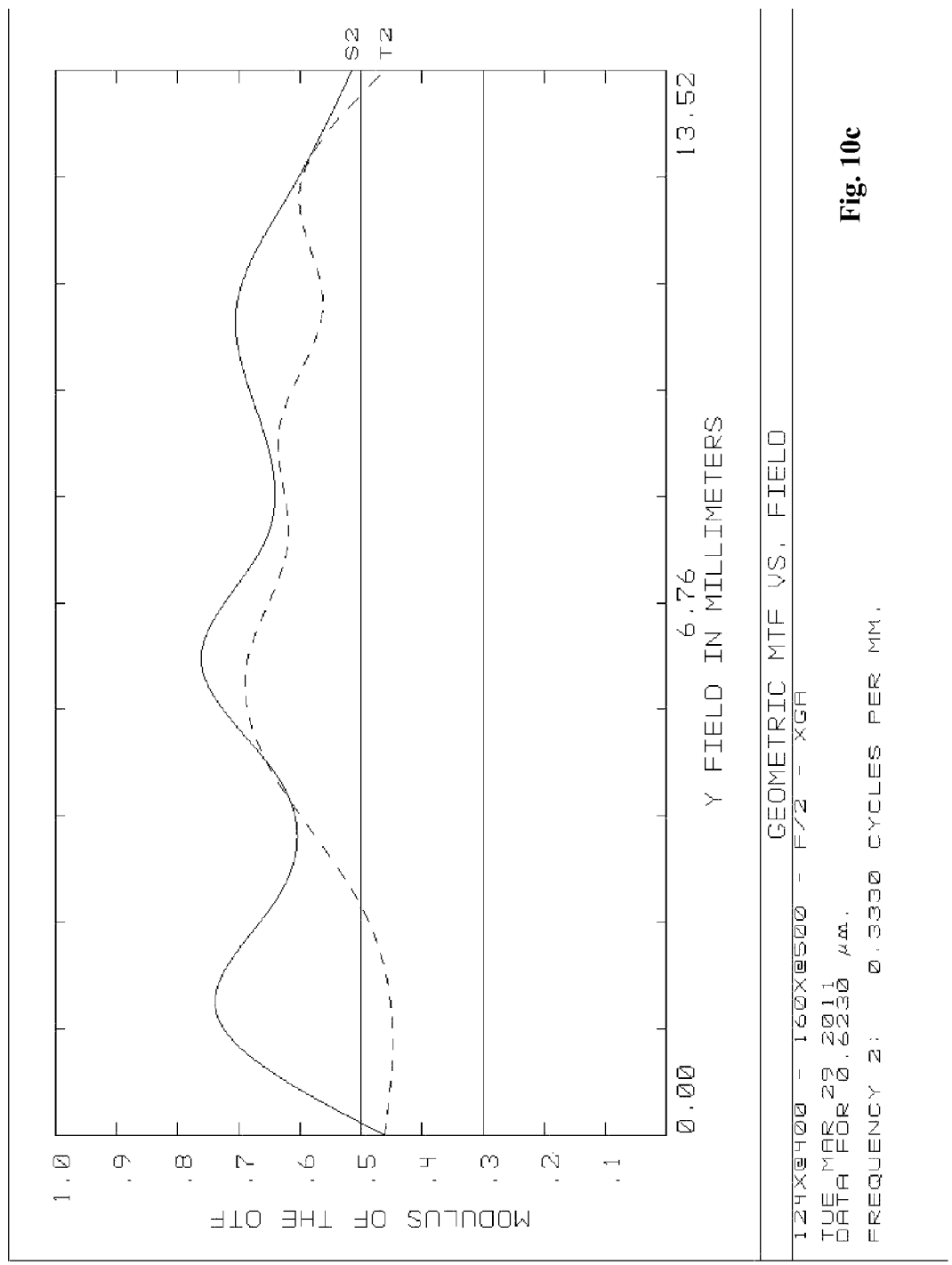
Figure 11A:
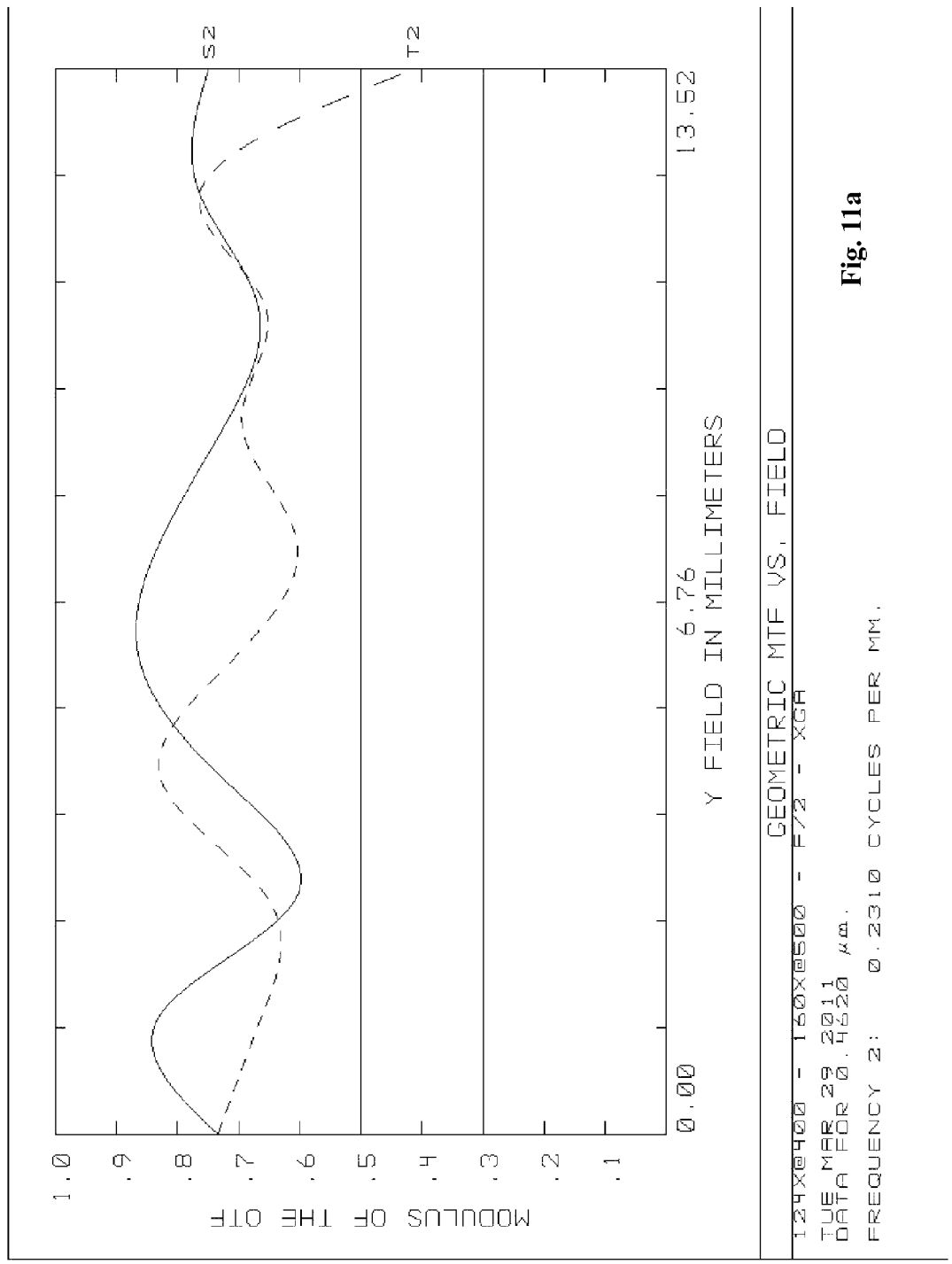
Figure 11B:
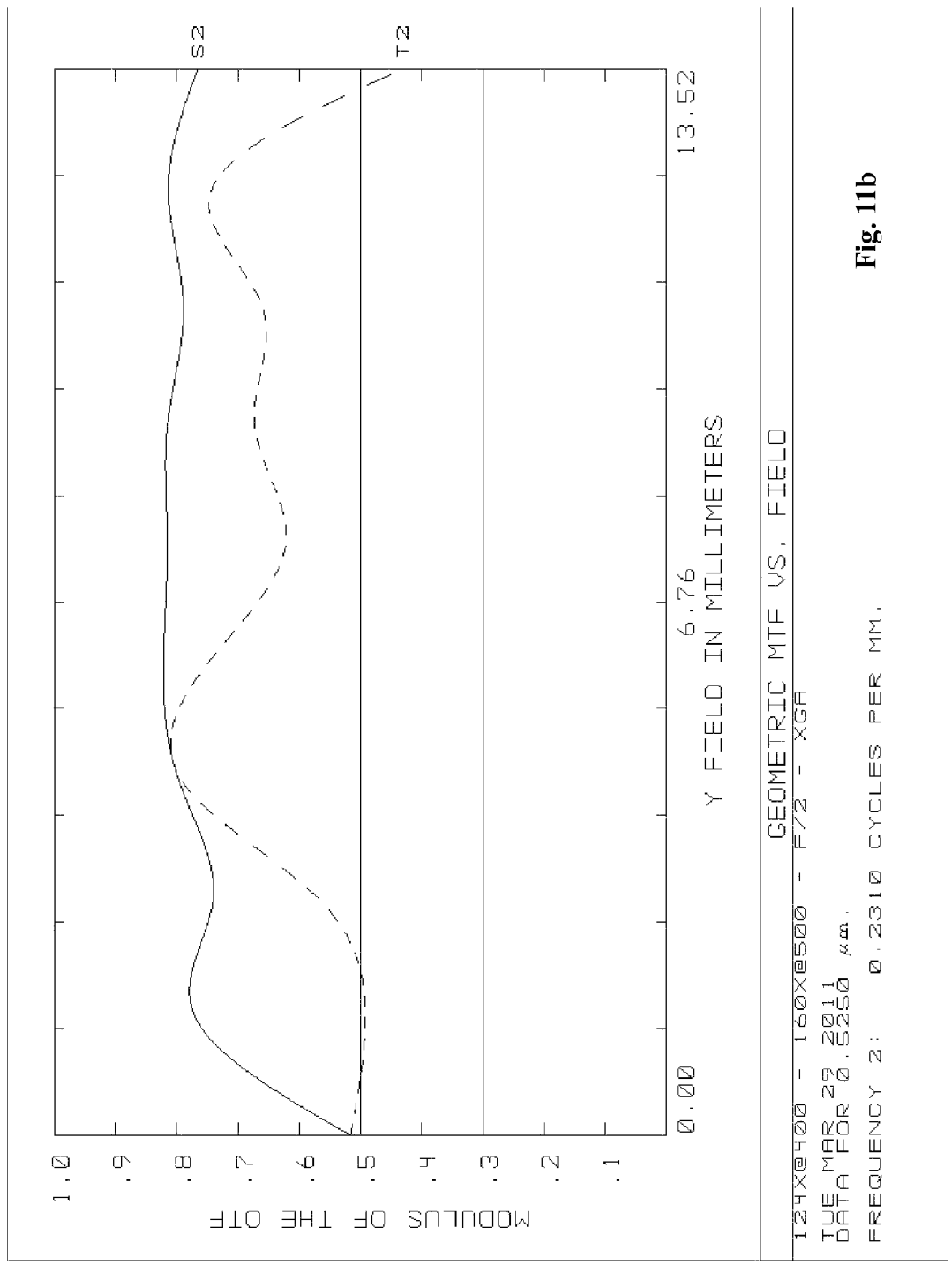
Figure 11C:
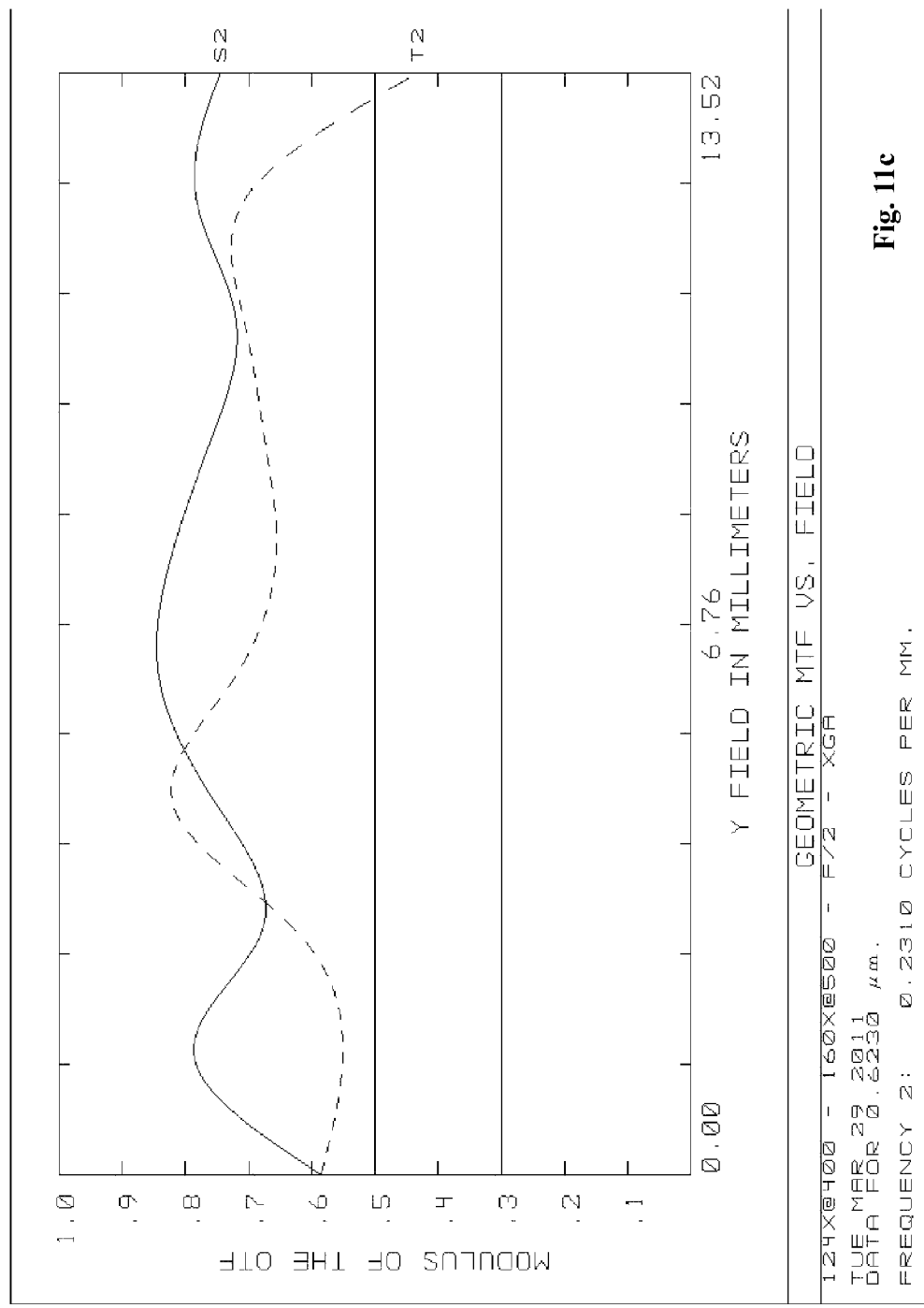

FIGS. 9, 10 and 11 give the modulation transfer functions of configurations 1, 2 and 3.

Figure 12:
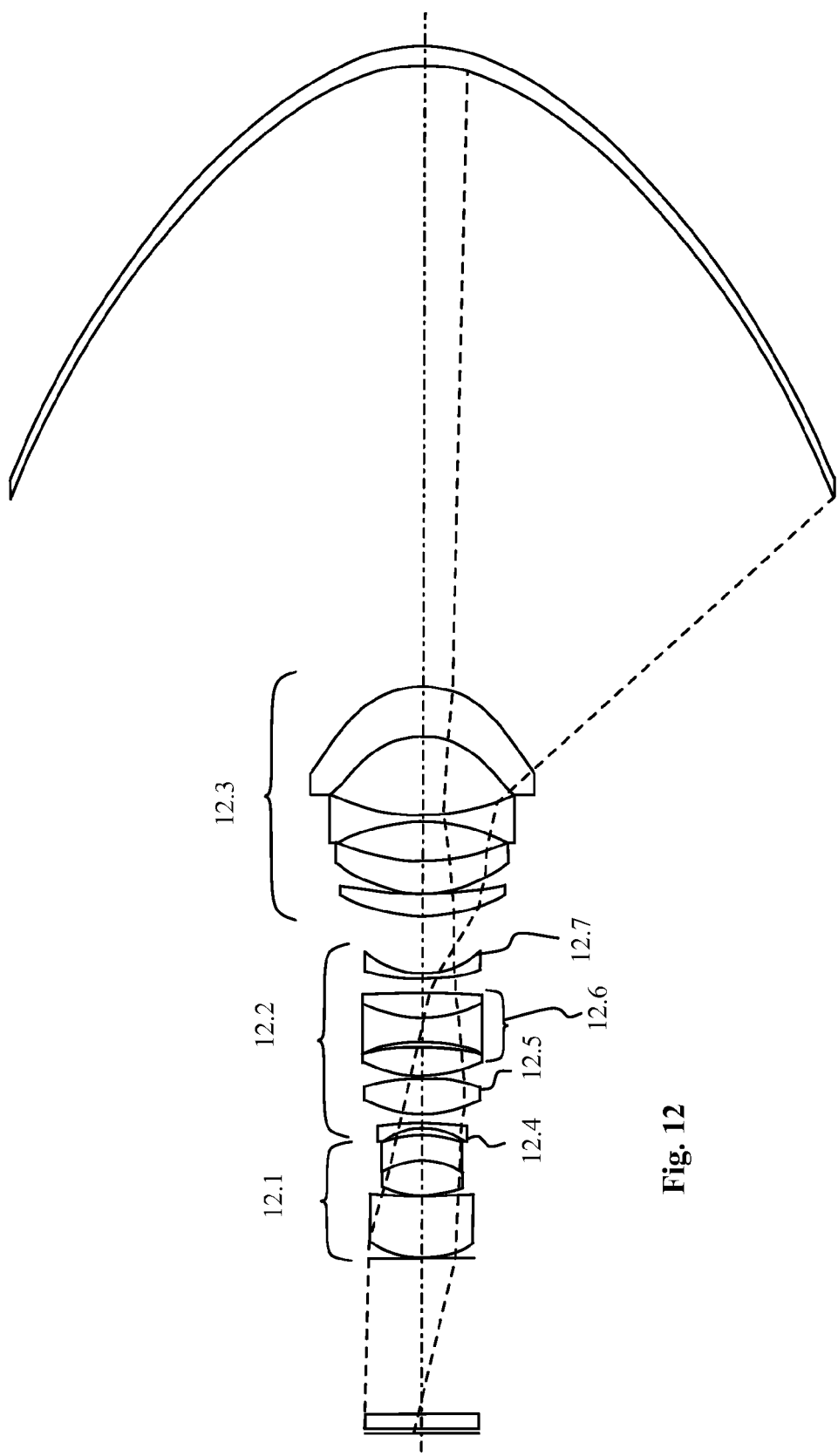
FIG. 12 illustrates the second example embodiment.

A second embodiment of the device is described hereinafter. The general structure of the device of the second embodiment is similar to the first embodiment and is illustrated by FIG. 12. The ocular 12.1 composed here of three lenses, an afocal lens system 12.2 composed of the lenses 12.4, 12.5, 12.6 and 12.7 and an objective 12.3 are found. The imager and the mirror are identical to those of the first example, except that the off-centring of the imager is 6.83 mm.

The objective has been simplified since the focusing takes place by a movement of the objective in a single piece. The objective must approach the mirror in order to obtain focusing at a greater distance from the mirror. This objective repeats the structure of the objective of the first example except that the meniscus and the last aspherical lens have their functionality combined in a single lens.

The afocal lens system meets the requirements of the second embodiment described above.

This second example, apart from the fact that it is simpler than the previous one, also has the advantage of having lesser intersection of the objective and intermediate image formed between the latter and the mirror. Unlike the previous implementation, the intermediate image is almost always outside the objective, except at the edge of the field.

FIGS. 13, 14 and 15 give the precise physical features of the second example embodiment in a similar fashion to the first example.

The various configurations given correspond to the equivalent configurations of the first example. In the same way, the device is parfocal. One focusing position is suitable for all the zoom positions.

Figure 16A:
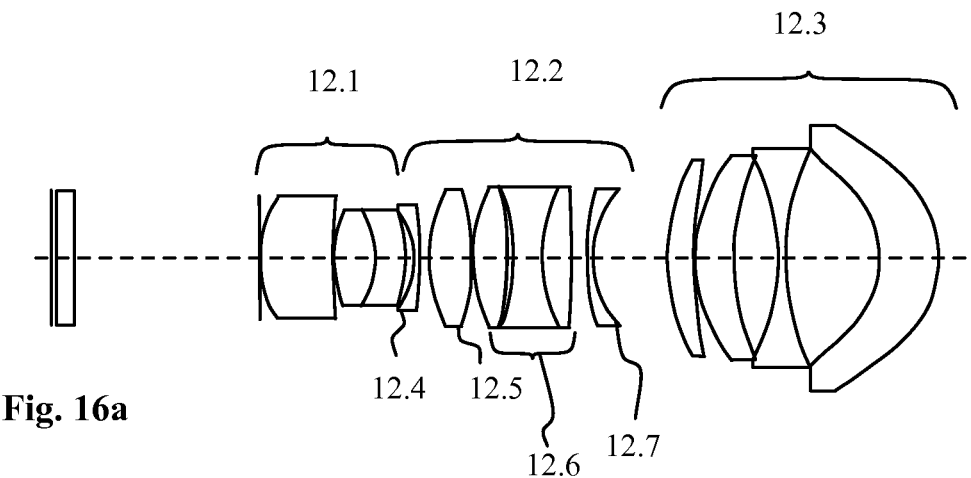
FIG. 16 illustrates the first three given configurations of the second example embodiment.
Figure 16B:
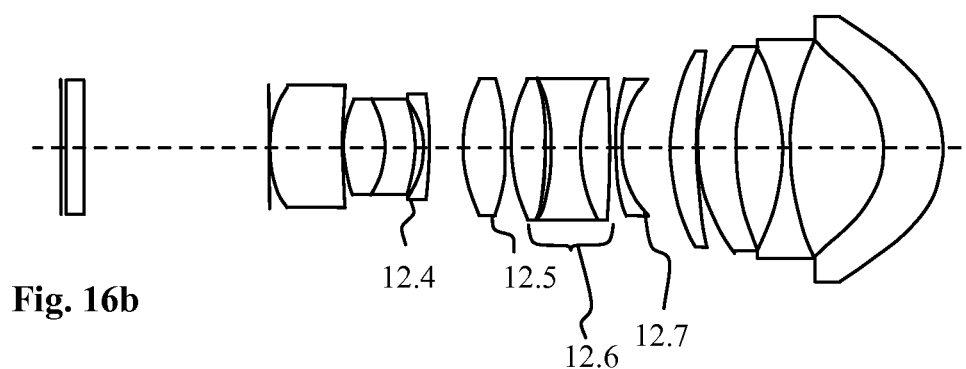
Figure 16C:
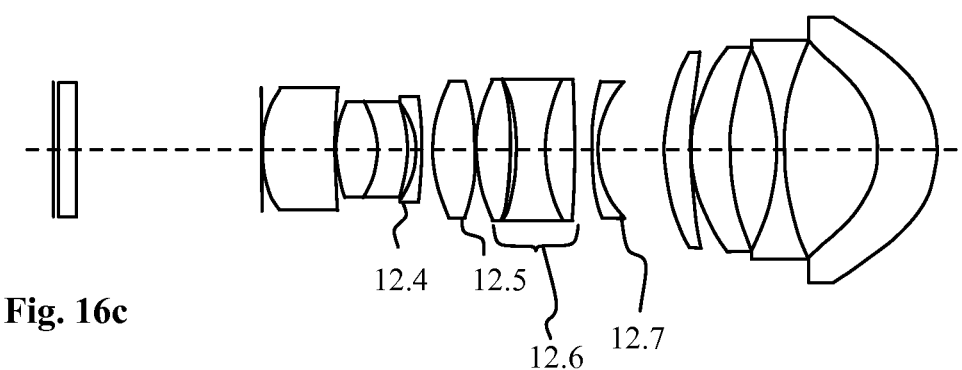

Likewise, FIGS. 16a, 16b and 16c illustrate configurations 1, 2 and 3.

Figure 17:
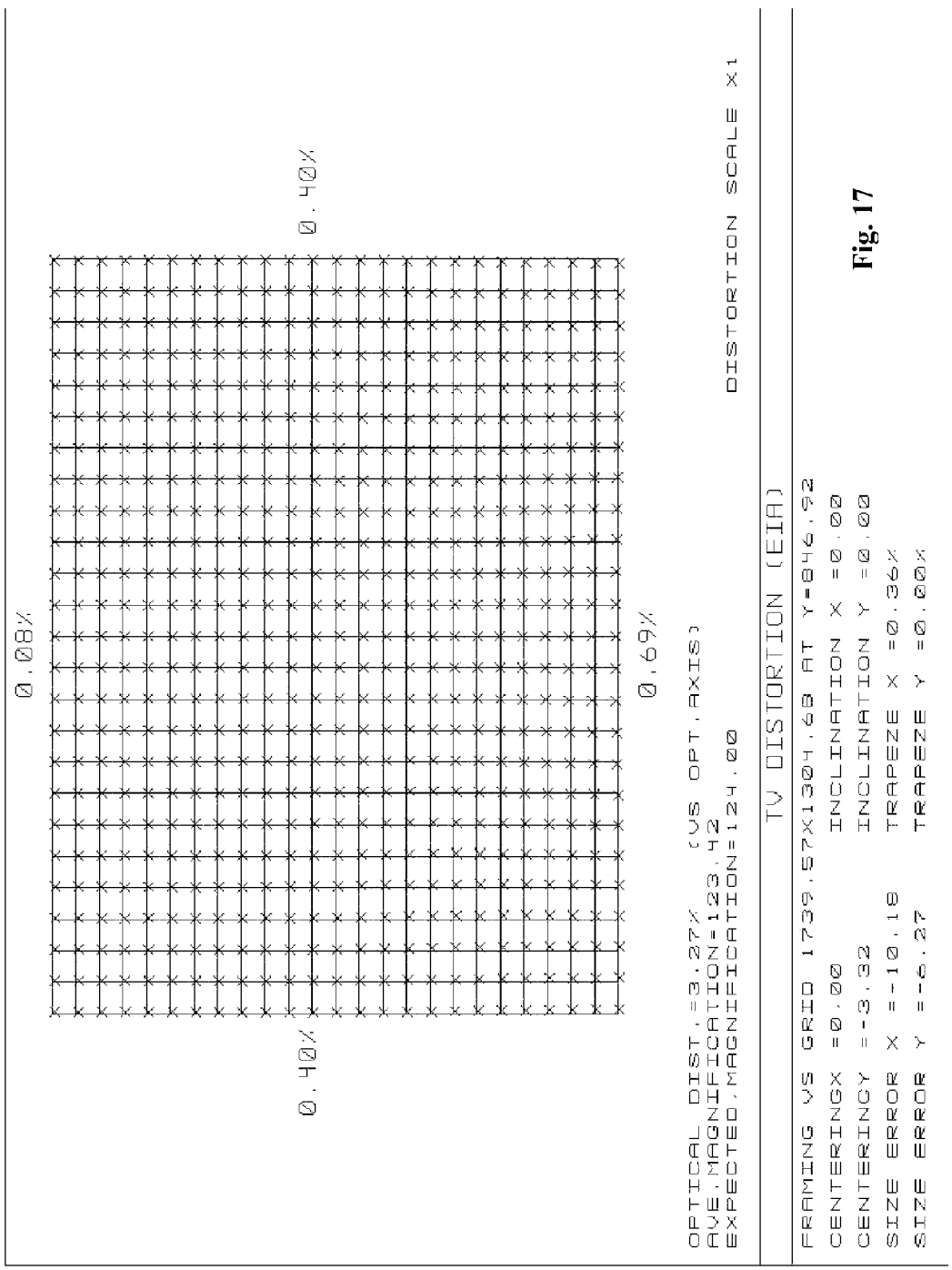
FIGS. 17, 18 and 19 give the distortion of the image in configurations 1, 2 and 3 of the second example embodiment.
Figure 18:
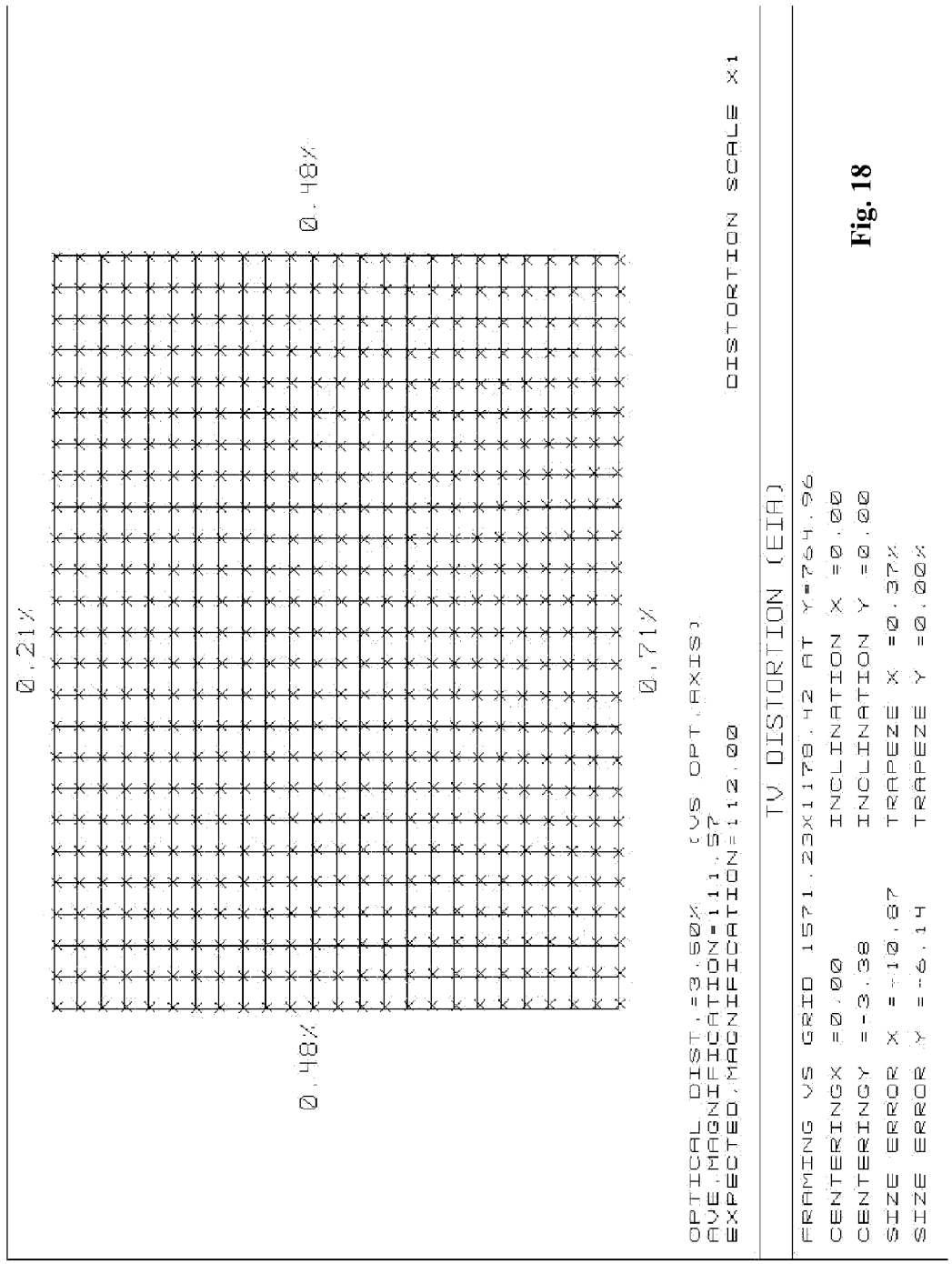
Figure 19:
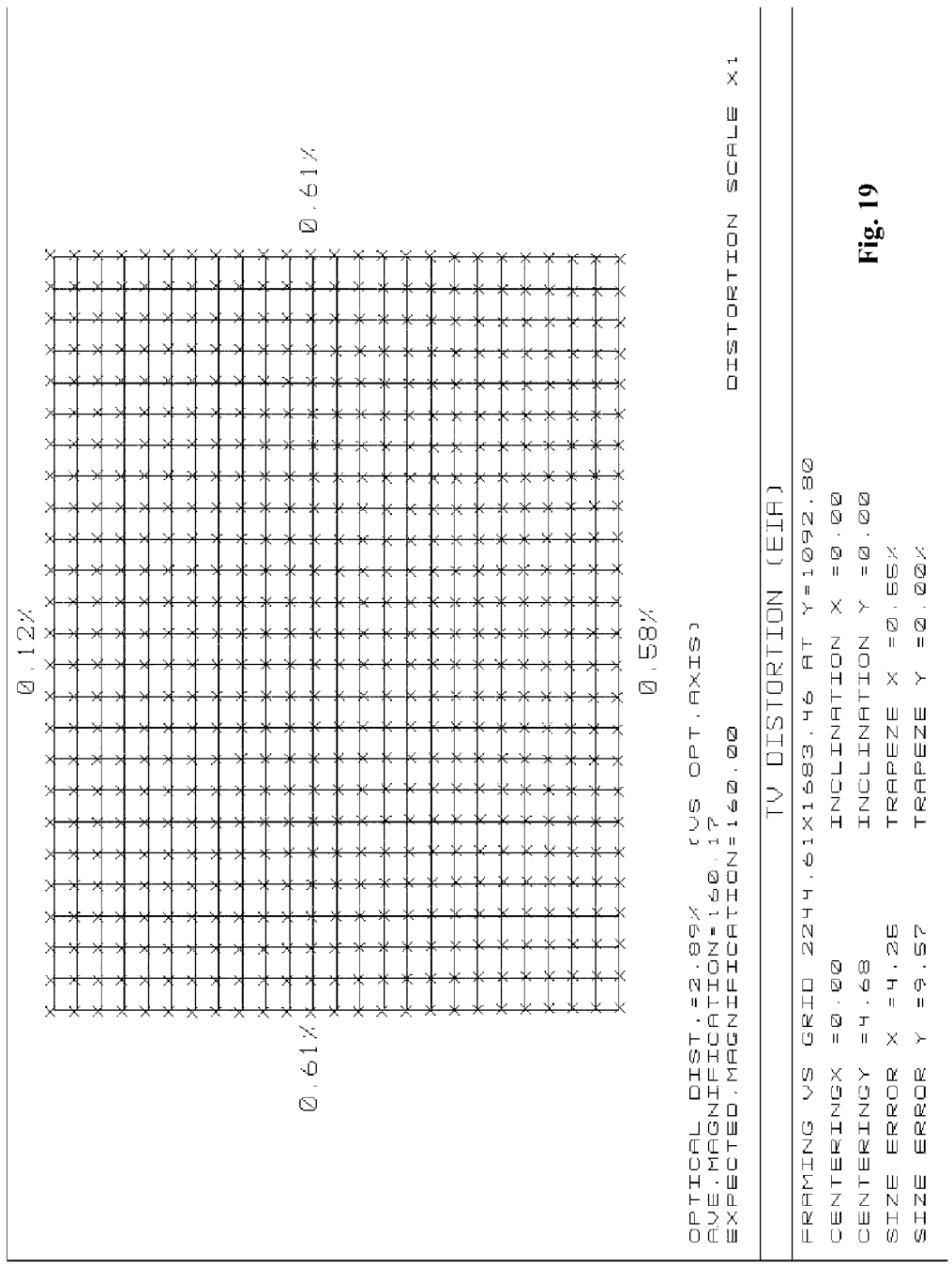

FIGS. 17, 18 and 19 give the distortion of the system for these configurations 1, 2 and 3.

Figure 20A:
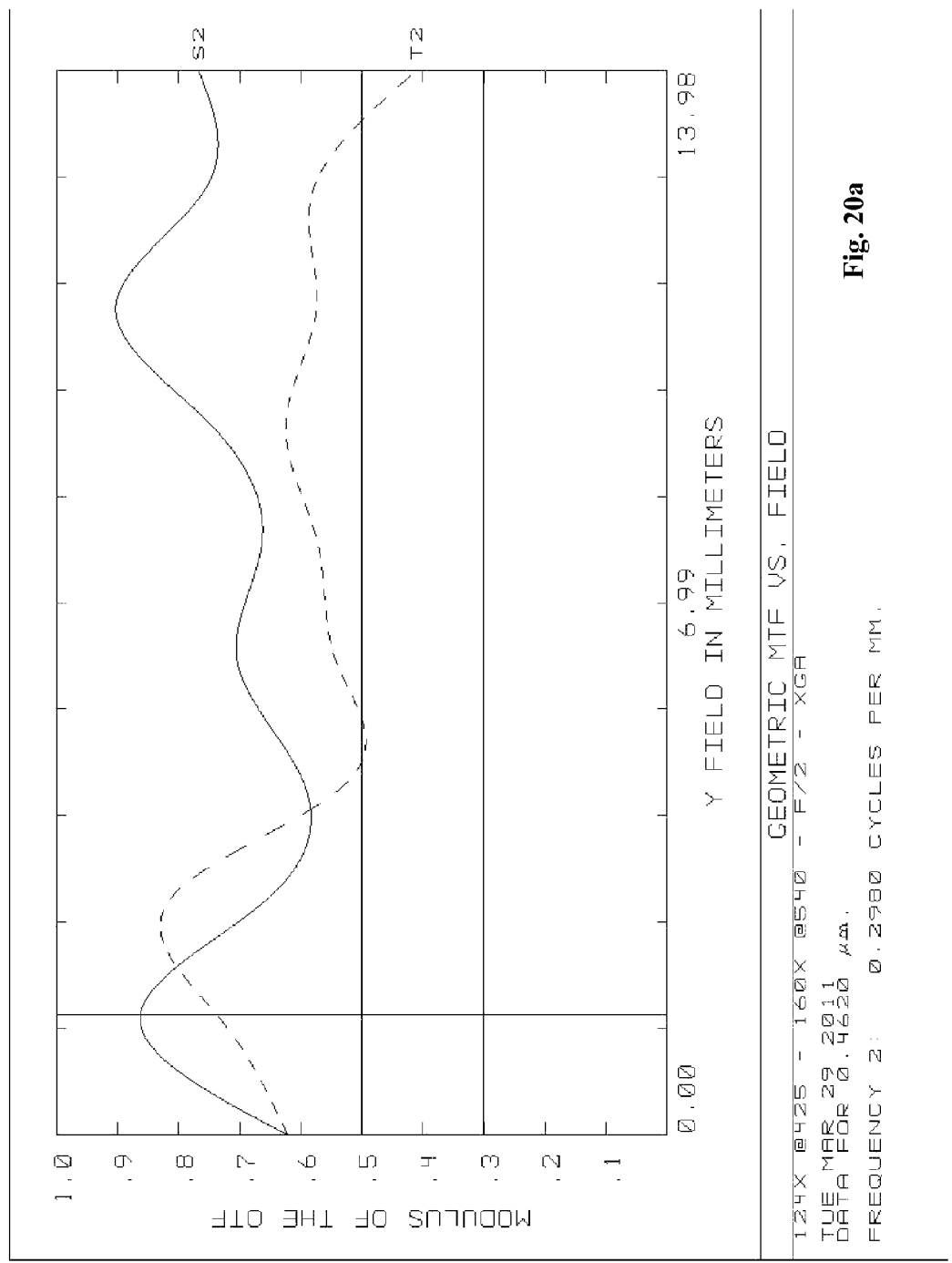
FIGS. 20, 21 and 22 give the modulation transfer functions of configurations 1, 2 and 3 of the first example embodiment.
Figure 20B:
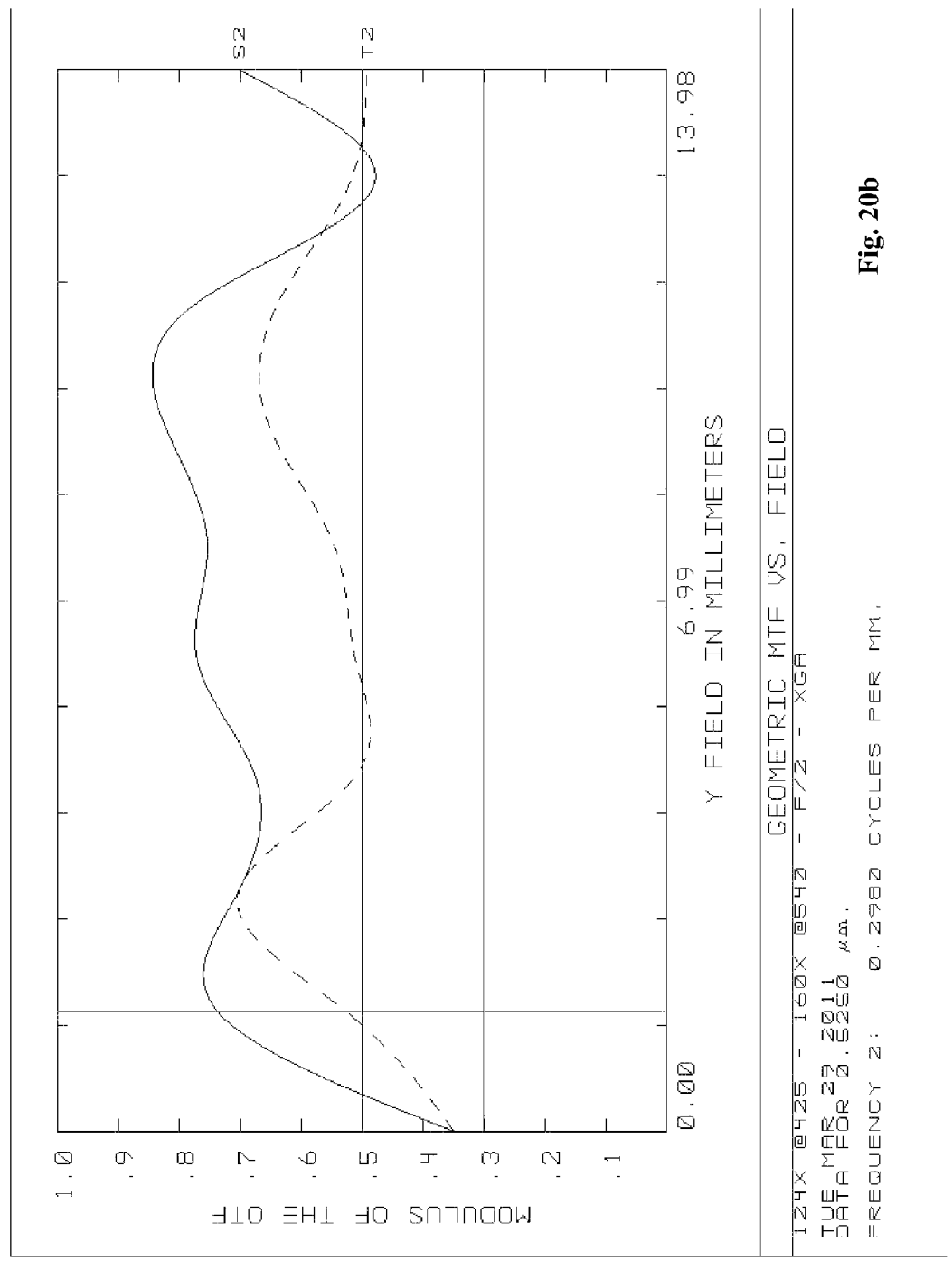
Figure 20C:
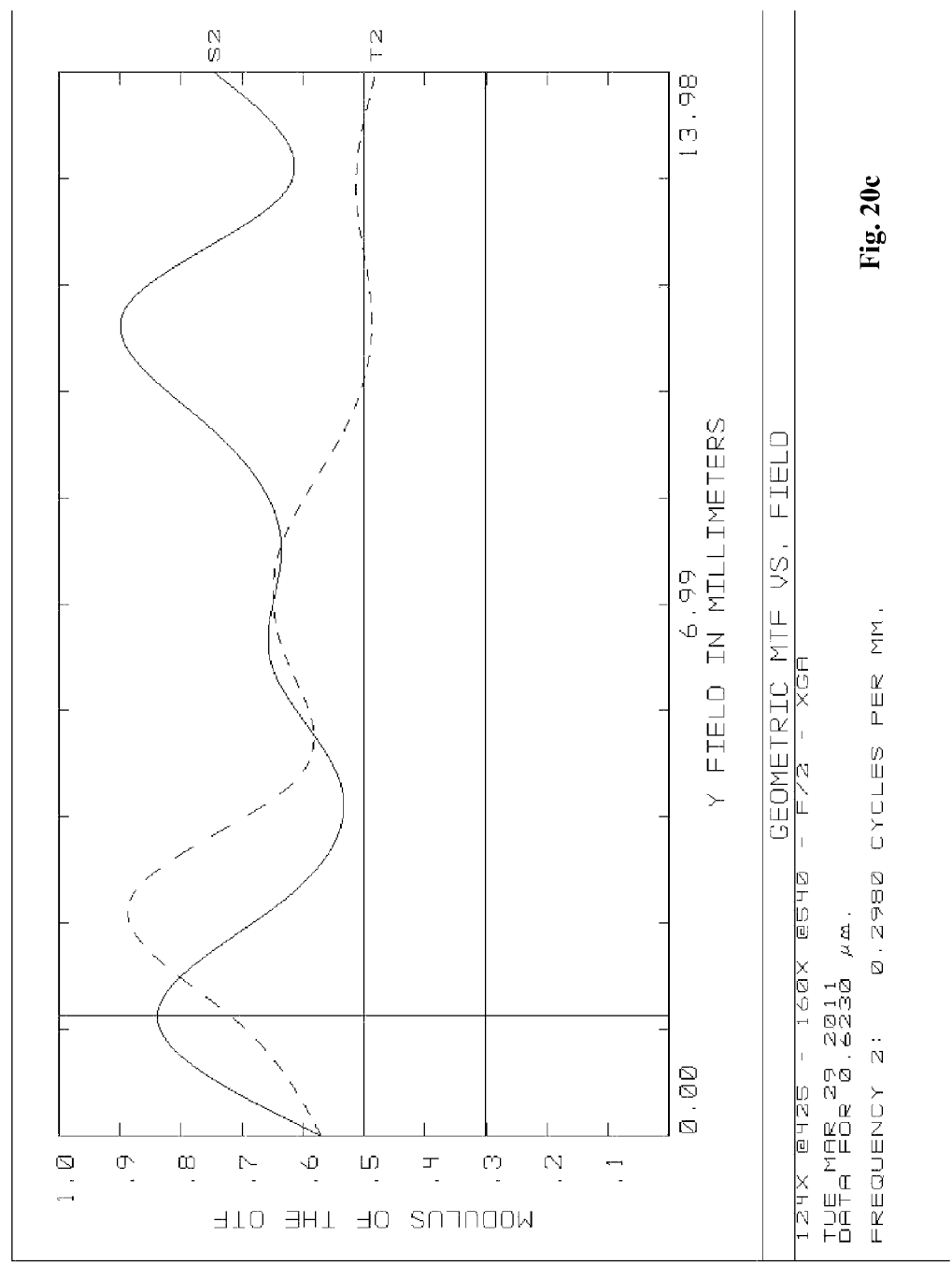
Figure 21A:
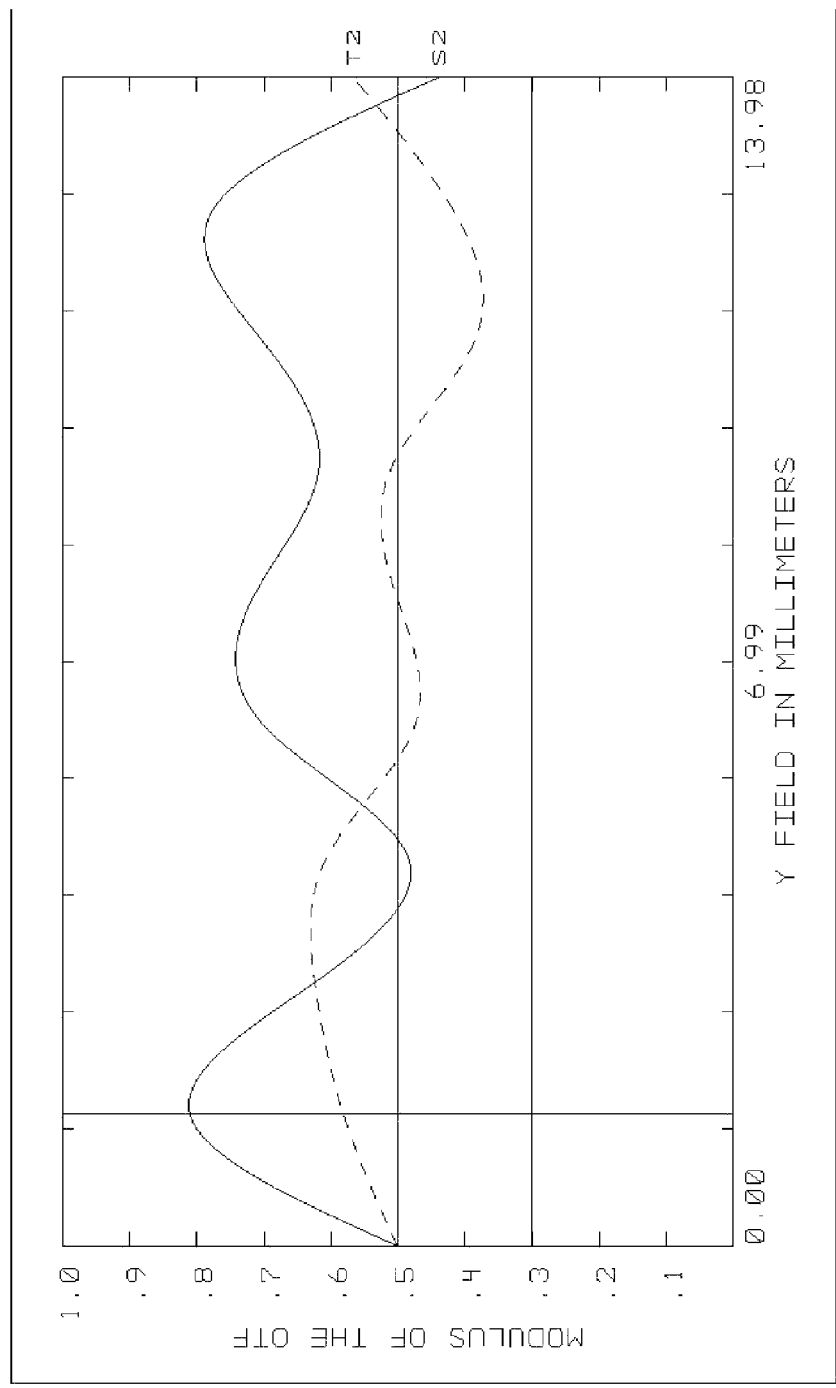
Figure 21B:
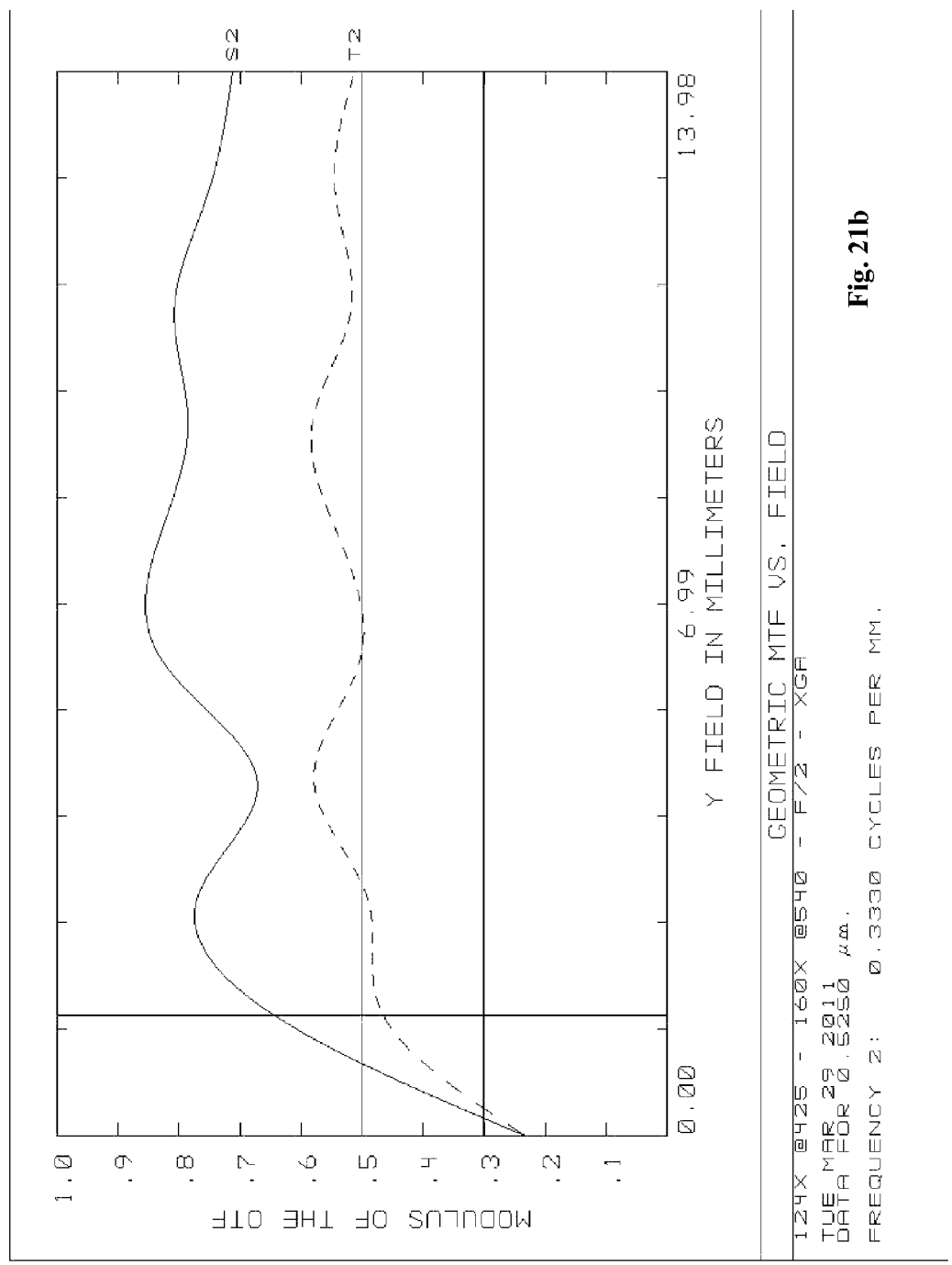
Figure 21C:
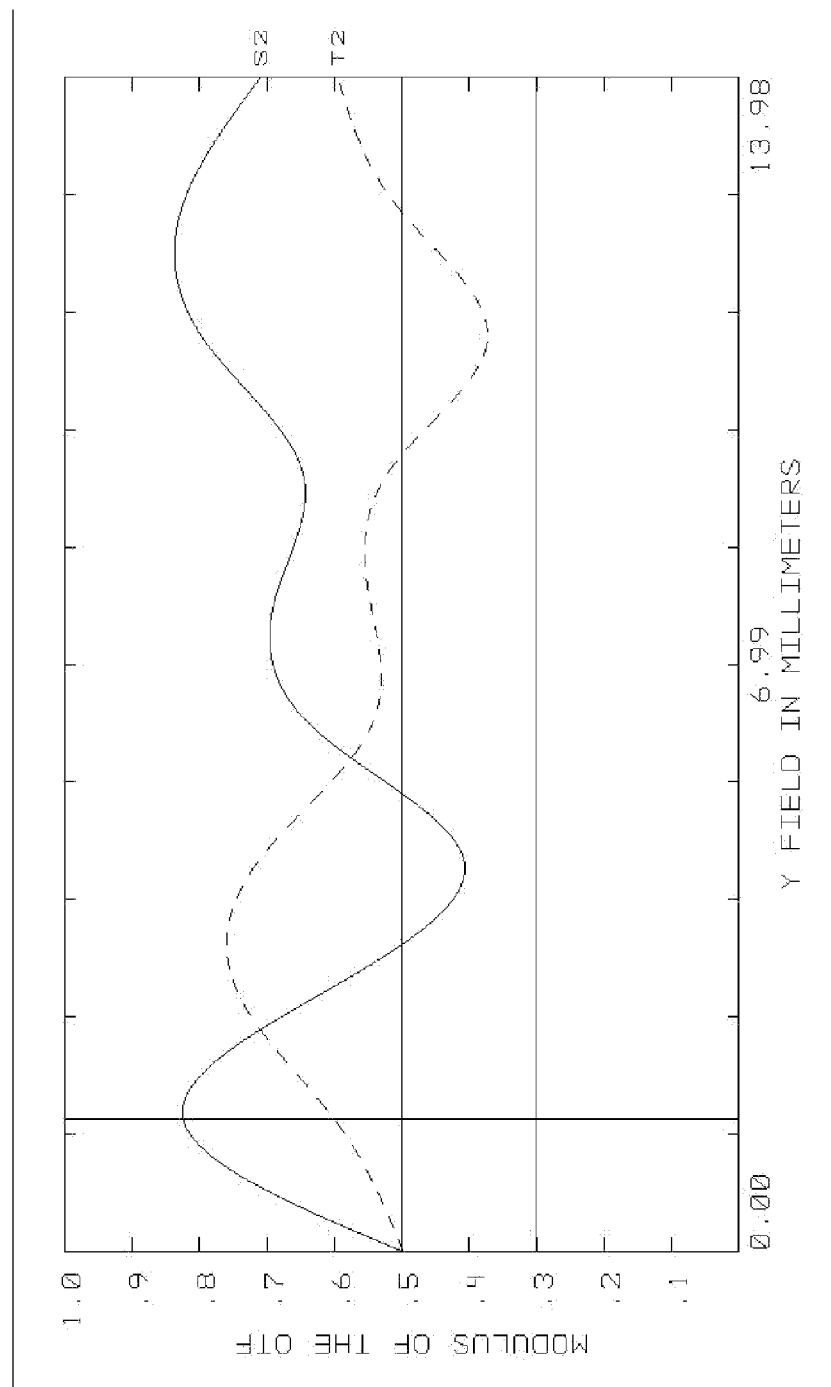
Figure 22A:
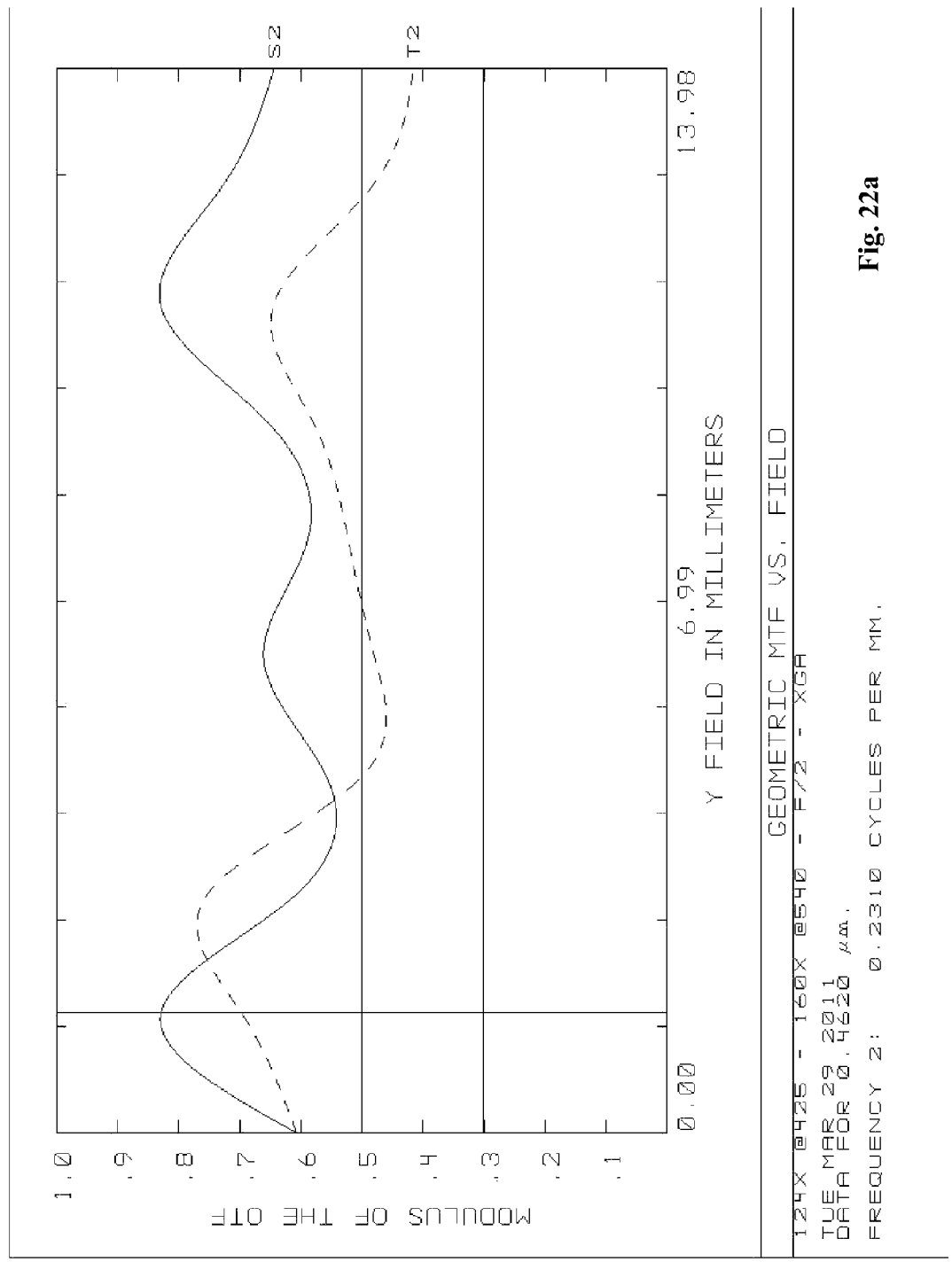
Figure 22B:
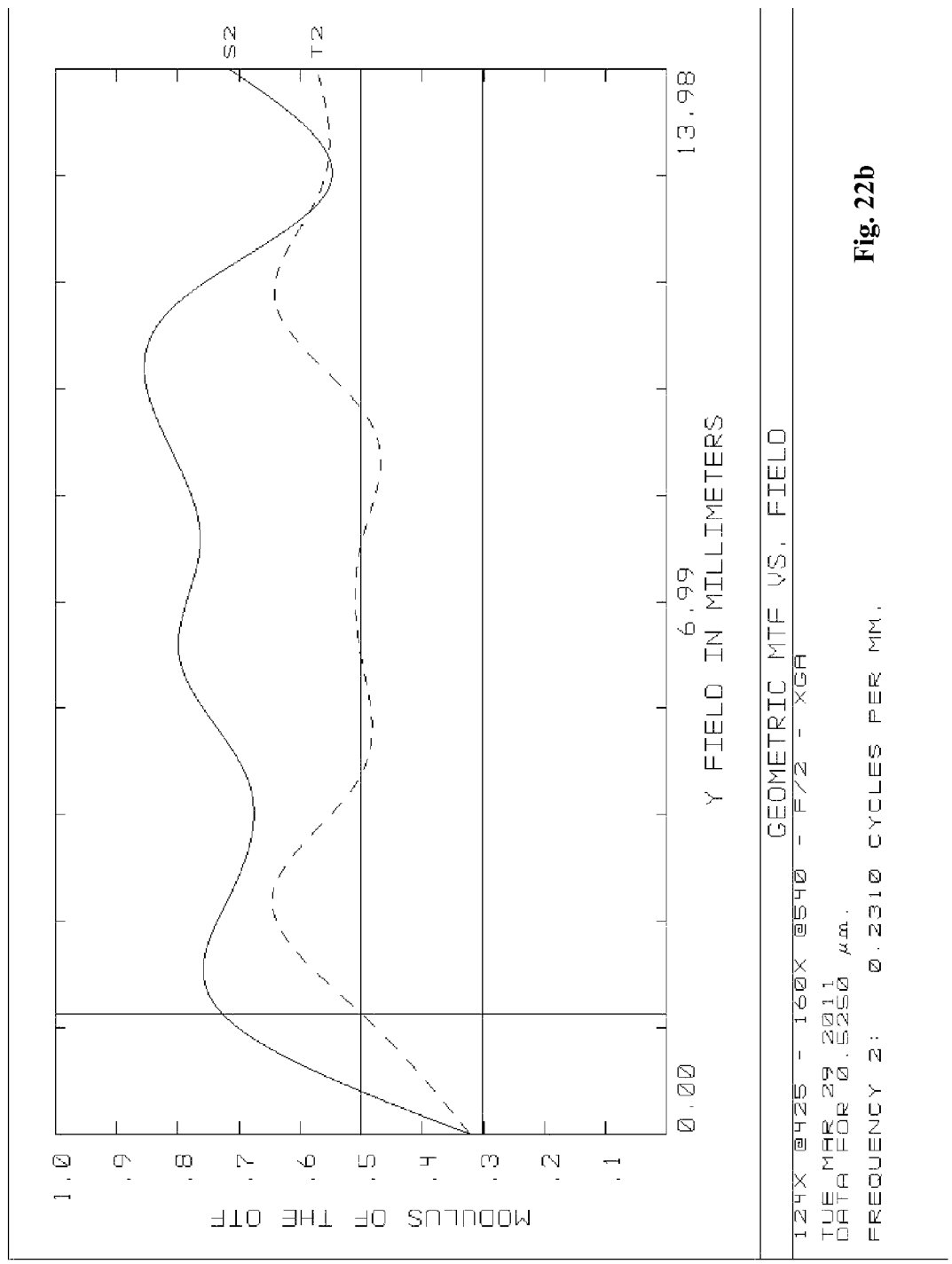
Figure 22C:
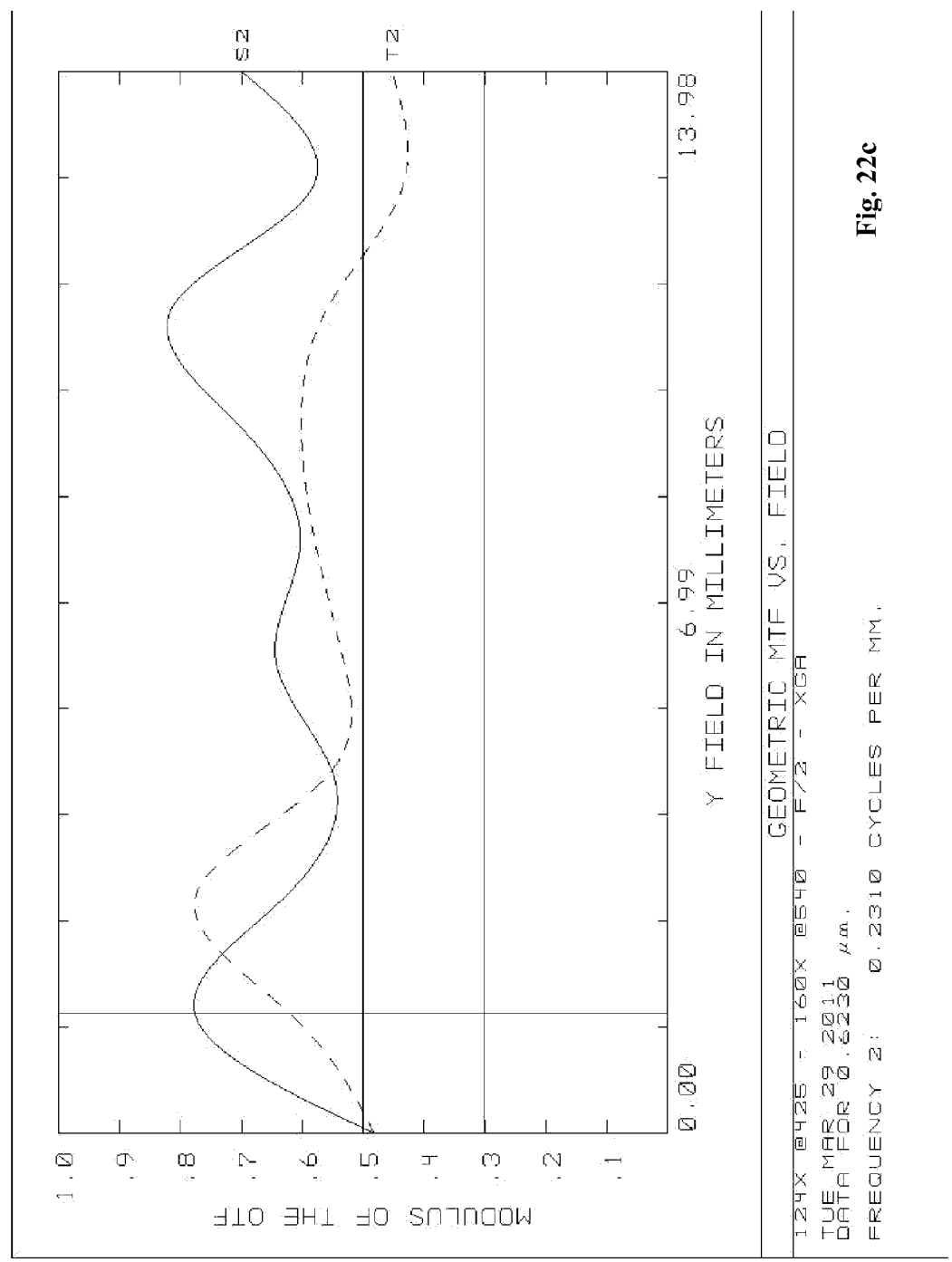

FIGS. 20, 21 and 22 give the modulation transfer functions of configurations 1, 2 and 3.

The invention claimed is:

1. A short distance projection device comprising, in light beam propagation direction:
   an imager providing an image;
   an ocular formed by a set of lenses forming an approximately parallel light beam from the image provided by the imager;
   an objective formed by a set of lenses forming an intermediate image with a field curvature from the approximately parallel light beam; and;
   an aspherical concave mirror generating a final image, the field curvature given by the objective compensating for a deformation introduced by the aspherical concave mirror from the intermediate image;
   and wherein the short-distance projection device comprises
      an afocal lens system consisting of a set of lenses between the ocular and the objective, these lenses being adapted to be translated on optical axis to vary magnification generated by the afocal lens system such as to provide the short-distance projection device with zoom capabilities;
   and wherein the lenses forming the objective are adapted to be translated on optical axis in order to enable varying a distance at which the final image is generated such as to provide the short-distance projection device with focus capabilities,
   and wherein the afocal lens system is composed of a first convergent lens followed by a first divergent lens, a second convergent lens and a second divergent lens.

2. The short-distance projection device according to claim 1, wherein the lenses forming the ocular, the afocal lens system and the objective, as well as the aspherical concave mirror, share the same optical axis.

3. The short-distance projection device according to claim 1, wherein, so as to obtain a reduction in the final image, the afocal lens system is formed so that:
   the first convergent lens is adapted to be translated on optical axis so as to enable moving said first convergent lens away from the ocular,
   the first divergent lens is adapted to be translated on optical axis so as to enable moving said first divergent lens closer to the first convergent lens, and
   said second divergent lens is adapted to be translated on optical axis to enable moving said second divergent lens away from the second convergent lens.

4. The short-distance projection device according to claim 1, wherein the objective comprises a first convergent lens, followed by one or more divergent lenses and then one or more lenses including at least one lens with centers of curvature situated on the same side as the surface of positive focal power situated close to the aspherical concave mirror, said surface being referred to as meniscus.

5. The short-distance projection device according to claim 4, wherein the objective is formed so that:
   all the lenses are adapted to be translated on optical axis to enable moving said lenses closer to the aspherical concave mirror, and
   the first convergent lens and the meniscus are adapted to be translated on optical axis to enable moving said first convergent lens and said meniscus closer to each other.

6. The short-distance projection according to claim 1, wherein the afocal lens system is formed so that the first and second convergent lenses and the second divergent lens are adapted to be translated on optical axis to enable an independent movement in the optical propagation direction.

7. The short-distance projection device according to claim 1, wherein the objective comprises a first convergent lens followed by one or more divergent lenses and then an aspherical lens.

8. The short-distance projection device according to claim 7, wherein the objective is adapted to be translated on optical axis as a whole.

9. The short-distance projection device according to claim 1, wherein said short-distance projection device has a constant aperture.

* * * * *